(12) United States Patent
Jimenez Pino et al.

(10) Patent No.: US 11,784,573 B2
(45) Date of Patent: Oct. 10, 2023

(54) HV/MV/LV DC/DC CONVERTER

(71) Applicant: LEAR CORPORATION, Southfield, MI (US)

(72) Inventors: Rafael Jimenez Pino, Valls (ES); Oscar Lucia Gill, Saragossa (ES); Magi Margalef Boquera, Valls (ES); Hector Sarnago Andia, Olvega (ES); Antonio Leon Masich, Valls (ES)

(73) Assignee: LEAR CORPORATION, Southfield, MI (US)

( * ) Notice: Subject to any disclaimer, the term of this patent is extended or adjusted under 35 U.S.C. 154(b) by 225 days.

(21) Appl. No.: 17/415,862

(22) PCT Filed: Feb. 10, 2020

(86) PCT No.: PCT/US2020/017468
§ 371 (c)(1),
(2) Date: Jun. 18, 2021

(87) PCT Pub. No.: WO2020/163857
PCT Pub. Date: Aug. 13, 2020

(65) Prior Publication Data
US 2022/0077789 A1 Mar. 10, 2022

Related U.S. Application Data

(60) Provisional application No. 62/802,817, filed on Feb. 8, 2019.

(51) Int. Cl.
*H02M 3/335* (2006.01)
(52) U.S. Cl.
CPC ... *H02M 3/33573* (2021.05); *H02M 3/33515* (2013.01); *H02M 3/33576* (2013.01)

(58) Field of Classification Search
CPC ............. H02M 3/335; H02M 3/33515; H02M 3/33573; H02M 3/33576
See application file for complete search history.

(56) References Cited

U.S. PATENT DOCUMENTS 6,137,240 A * 10/2000 Bogdan ............... H02M 1/4225
315/307
6,349,044 B1 2/2002 Canales-Abarca et al.
(Continued)

OTHER PUBLICATIONS

International Search Report dated Apr. 29, 2020 for PCT Appn. No. PCT/US2020/017468 filed Feb. 10, 2020, 13 pgs.
(Continued)

*Primary Examiner* — Gary L Laxton
(74) *Attorney, Agent, or Firm* — Brooks Kushman P.C.

(57) ABSTRACT

In at least one embodiment, a power conversion device for a vehicle is provided. The power conversion device includes a transformer, a microcontroller, and a control circuit. The microcontroller is configured to operate at a first frequency to receive a first current signal indicative of a current of a first voltage network and to generate a first envelope control signal in response to the first current signal. The controller is configured to selectively switch a first plurality of switches on a primary side and a second plurality of switches on a secondary side to convert a first input signal into first output signal in response to at least the first envelope control signal. The controller is further configured to selectively switch the first plurality of switches and the second plurality of switches at a second frequency that is greater than the first frequency.

20 Claims, 18 Drawing Sheets

(56) References Cited

U.S. PATENT DOCUMENTS

| | | | |
|---|---|---|---|
| 6,611,130 B2 | 8/2003 | Chang | |
| 6,683,797 B2 | 1/2004 | Zaitsu et al. | |
| 9,419,522 B1 | 8/2016 | Khaligh et al. | |
| 9,490,719 B2 * | 11/2016 | Scandola | H02M 3/01 |
| 10,122,367 B1 * | 11/2018 | Albertini | H02M 3/33584 |
| 2007/0159866 A1 * | 7/2007 | Siri | H02M 7/53803 |
| | | | 363/95 |
| 2008/0106243 A1 * | 5/2008 | Cheon | H02M 1/36 |
| | | | 323/238 |
| 2008/0303501 A1 | 12/2008 | Prodic | |
| 2012/0163037 A1 * | 6/2012 | Hong | H02M 3/3387 |
| | | | 363/21.02 |
| 2013/0021827 A1 | 1/2013 | Ye | |
| 2014/0361742 A1 | 12/2014 | Chung et al. | |
| 2015/0340957 A1 * | 11/2015 | Fang | H05B 45/385 |
| | | | 363/21.16 |
| 2017/0005619 A1 | 1/2017 | Khlat | |
| 2017/0353113 A1 | 12/2017 | Ono | |
| 2018/0278168 A1 * | 9/2018 | Brown | H02J 7/0068 |

OTHER PUBLICATIONS

International Preliminary Report on Patentability dated Aug. 19, 2021 for PCT Appn. No. PCT/US2020/017468 filed Feb. 10, 2020, 13 pgs.

* cited by examiner

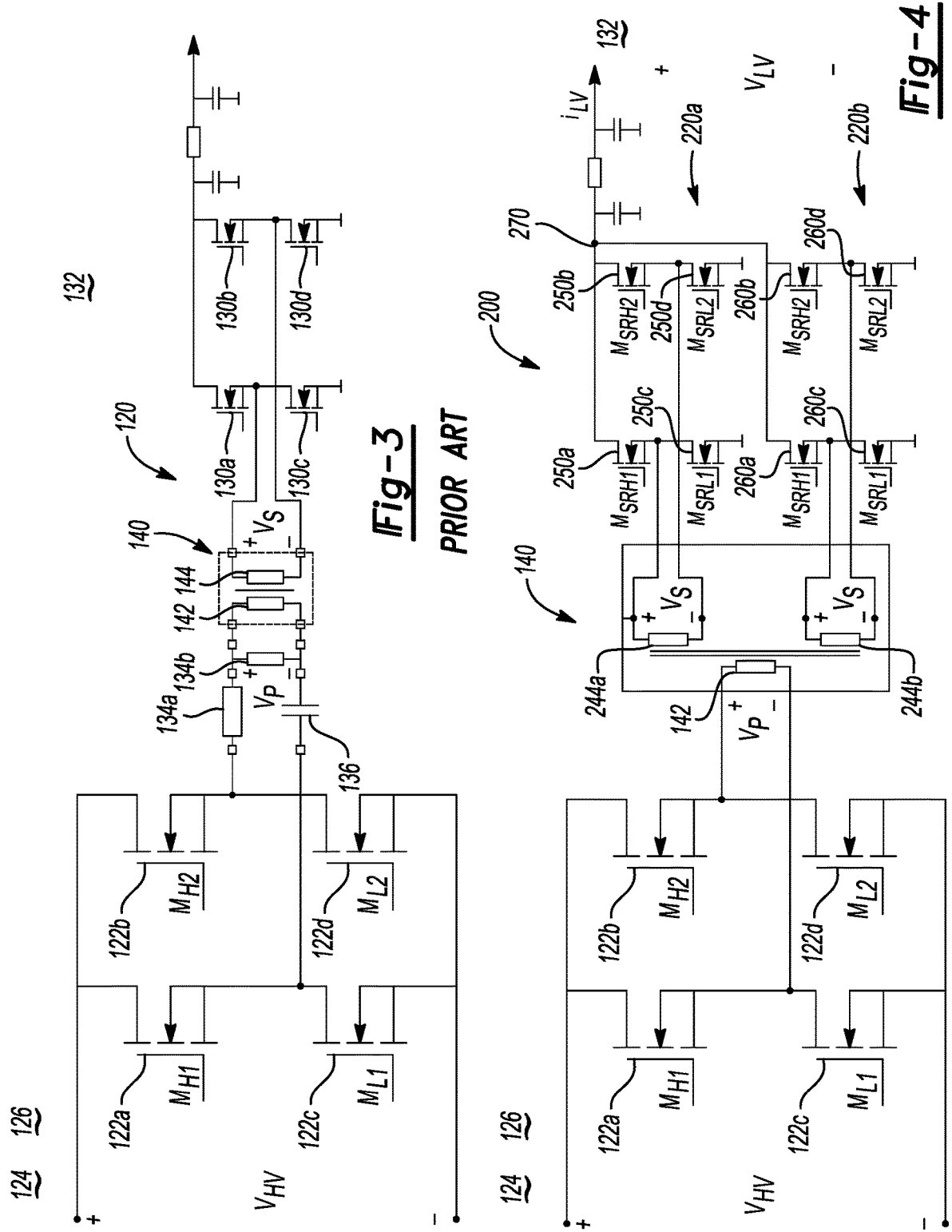

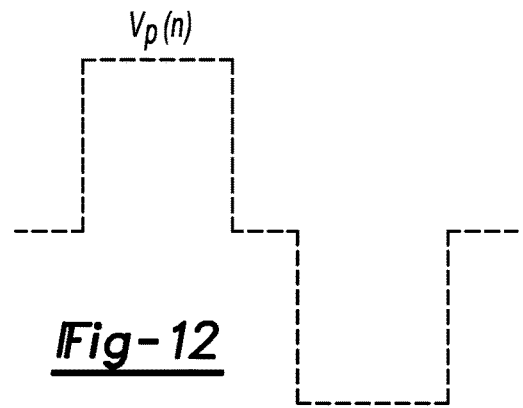
*Fig-12*
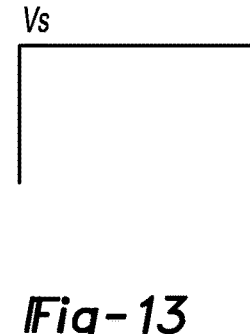
*Fig-13*
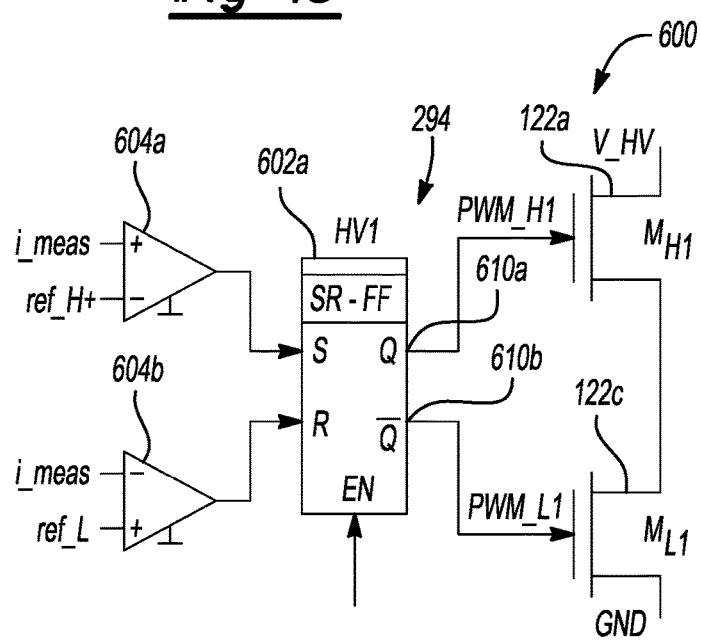
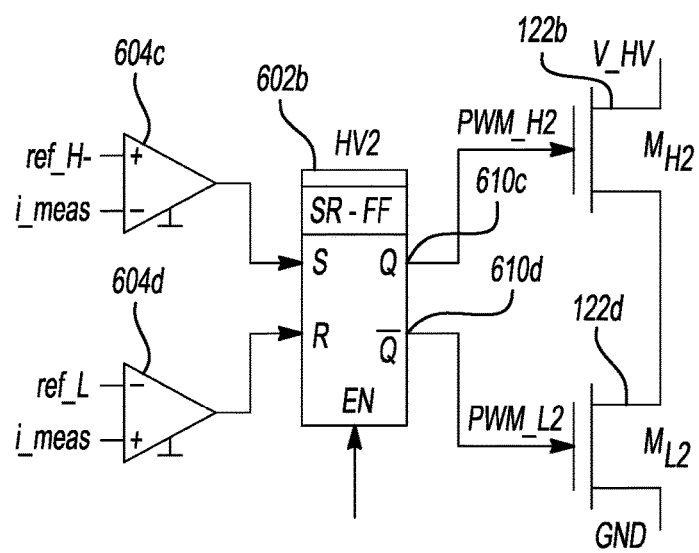
*Fig-14*

HV/MV/LV DC/DC CONVERTER

CROSS-REFERENCE TO RELATED APPLICATION

This application is the U.S. national phase of PCT Application No. PCT/US2020/017468 filed on Feb. 10, 2020, which claims the benefit of U.S. provisional application Ser. No. 62/802,817, filed Feb. 8, 2019, the disclosure of which is hereby incorporated in its entirety by reference herein.

TECHNICAL FIELD

Aspects disclosed herein may generally relate to direct current (DC)/DC converters.

BACKGROUND

US Patent Publication No. 2014/03617421 to CHUNG et al. provides an electric vehicle charger including a DC/DC converter and control circuits. The DC/DC converter includes an inverter module; a transformer module connected to the inverter module; and a converter module connected to the transformer module. The control circuits include a multi-loop feedback control system connected to the converter module; and gate driving circuits connected to the multi-loop feedback control system and the inverter module. The inverter module includes an IGBT bridge. The transformer module includes a transformer. The converter module includes a diode rectifier bridge.

SUMMARY

In at least one embodiment, a power conversion device for a vehicle is provided. The power conversion device includes a transformer, a microcontroller, and a control circuit. The transformer includes a primary side and a secondary side. The microcontroller is configured to operate at a first frequency to receive a first current signal indicative of a current of a first voltage network and to generate a first envelope control signal in response to the first current signal. The controller is configured to selectively switch a first plurality of switches on the primary side and a second plurality of switches on the secondary side to convert a first input signal into a first output signal in response to at least the first envelope control signal. The controller is further configured to selectively switch the first plurality of switches and the second plurality of switches at a second frequency that is greater than the first frequency.

In at least another embodiment, a power conversion device for a vehicle is provided that includes a microcontroller and a control circuit. The microcontroller is configured to operate at a first frequency to receive a first current signal indicative of a current of a first voltage network and to generate a first envelope control signal in response to the first current signal. The controller is further configured to selectively switch a first plurality of switches on a first side of a transformer and a second plurality of switches on a second side of the transformer to convert a first input signal into a first output signal in response to at least the first envelope control signal. The controller is further configured to selectively switch the first plurality of switches and the second plurality of switches at a second frequency that is greater than the first frequency.

In at least another embodiment, a computer-program product embodied in a non-transitory computer readable medium that is programmed to convert a first input signal into a first output signal for a vehicle. The computer-program product includes instructions to operate at a first frequency to receive a first current signal indicative of a current of a first voltage network and to generate a first envelope control signal in response to the first current signal. The computer-program product further includes instructions to selectively switch a first plurality of switches on a first side of a transformer and a second plurality of switches on a second side of the transformer to convert the first input signal into the first output signal in response to at least the first envelope control signal, wherein the second frequency is greater than the first frequency.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 3 depicts one example of a classic LLC DC/DC converter;

FIG. 4 depicts one example of a DC/DC converter (DAB) with a single primary winding and multiples secondaries windings in accordance with one embodiment;

FIG. 12 depicts a voltage at a primary side of the DC/DC converter (DAB) in accordance with one embodiment;

FIG. 13 depicts a voltage at a secondary side of the DC/DC converter (DAB) in accordance with one embodiment;

FIG. 14 depicts a first portion of a control circuit for selectively controlling one or more switches in accordance with one embodiment;

DETAILED DESCRIPTION

Figure 1:
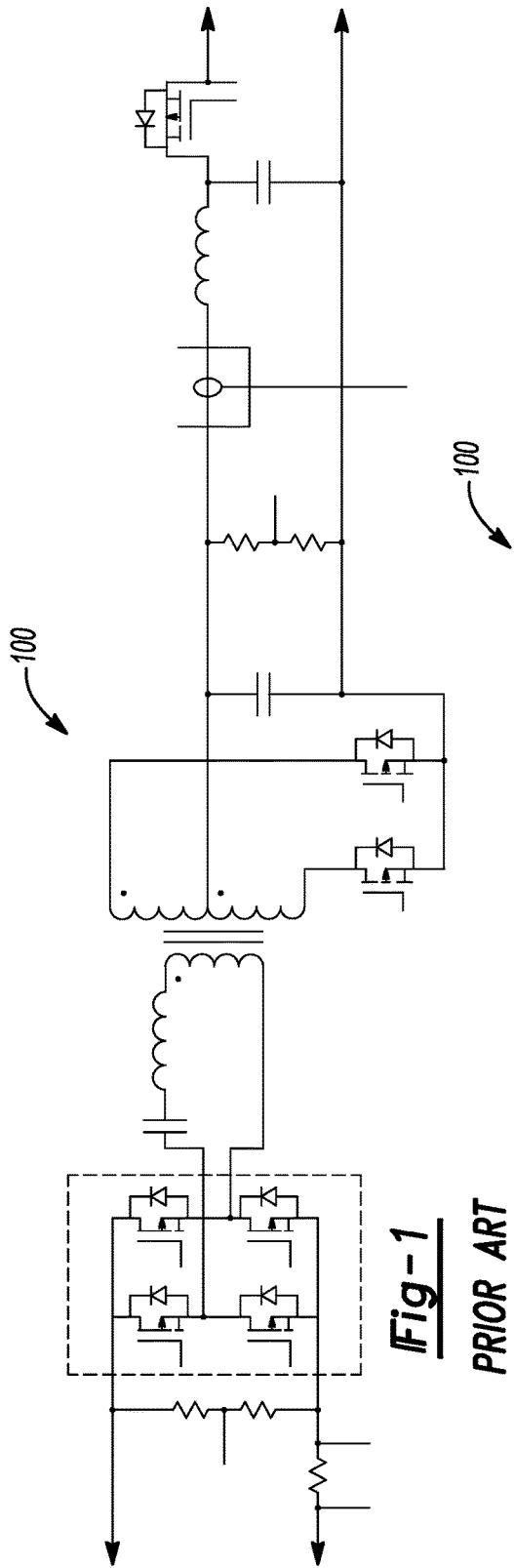
FIG. 1 depicts one example of a resonant LLC topology.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that various electrical devices such as servers, controllers, and clients, etc. as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, these electrical devices utilize one or more microprocessors to execute a computer-program that is embodied in a non-transitory computer readable medium that is programmed to perform any number of the functions as disclosed. Further, the various electrical devices as provided herein include a housing and various numbers of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The electrical devices also include hardware-based inputs and outputs for receiving and transmitting data, respectively from and to other hardware-based devices as discussed herein.

A DC/DC converter converts a DC input voltage into a DC output voltage. More particularly, a boost DC/DC converter converts a DC input voltage with a DC input current into a higher DC output voltage with a lower DC output current. Conversely, a buck DC/DC converter converts a DC input voltage with a DC input current into a lower DC output voltage with a higher DC output current.

A DC/DC converter includes a set of input power switches, a transformer, and a set of output power switches. The input power switches are controlled to invert the DC input voltage into an AC input voltage. The transformer transforms the AC input voltage into an AC output voltage having a different voltage level. The output power switches are controlled to rectify the AC output voltage into the DC output voltage.

As examples, DC/DC converters, as provided herein, may be configured to provide the following DC input/output pairings: 400-12; 48-12; 400-48; and 800-12. As such, for instance, a 400-12 V DC/DC converter may be used to convert a 400 V DC input into a 12 V DC output. As such, the 400-12 V DC/DC converter may be used between a 400 V DC network and a 12 V DC network to thereby connect these two voltage networks together. Of course, the DC/DC converters are usable over voltage ranges. For example, the 400-12 V DC/DC converter may be used to convert a DC input voltage falling within a voltage range of 250-470 V DC into a DC output voltage into a 12 V DC output voltage.

A vehicle may have a high-voltage (HV) network and a low-voltage (LV) network. In this case, a DC/DC converter may be used to connect the HV and LV networks together. Consequently, a high DC input voltage of the HV network may be converted by the DC/DC converter into a low DC output voltage for use by loads connected to the LV network. Conversely, assuming the DC/DC converter is bidirectional, a low DC input voltage of the LV network may be converted by the DC/DC converter into a high DC output voltage for use by loads connected to the HV network.

Nowadays, electric energy conversion may be a well-known technology. Most of the times, energy conversion or regulation may be needed to supply an electric load from an AC (alternate current) or DC (discrete current) source. In the automotive market, historically the electric system has been based in a 12 Vdc battery but, as electronics efficiency has improved, reducing loses and power use, conversion to lower voltages, like 5 Vdc or even 3.3 Vdc may require small energy converters.

But the appearance of the electric or hybrid vehicle, with electric energy applied in the powertrain, may have necessitated the integration of a higher-voltage battery (400V) to store much higher energies. With two voltage networks in the electric architecture of these vehicles, now there is a desire to transfer energy from one network to the other.

In the recent years, such a desire has become regularized with a series of DC voltages (12V, 48V, 400V and 800V) and a power transfer energy ranging from around 500 W to around 5 kW. As this power conversion technology comes from the industrial market, several topologies (electric conversion systems) are available, each one with properties to make it more suitable for a specific conversion scenario.

But in the automotive market, DC-DC converters may be equally required by all original equipment manufacturers (OEMs). Therefore, a common solution to approach all conversion scenarios may be needed. Of course, this combines with the robustness, size and weight optimization, and the minimized product and development costs that are required to all products in the automotive market.

FIG. 1 depicts one example of a resonant (inductor-capacitor) LLC topology 100 that may be used as a DC/DC converter. Specifically, the resonant LLC topology 100 may perform high voltage (HV) to low voltage (LV) DC/DC conversion. In general, components that form the resonant LLC topology 100 may require new components along with new development to support differing converter voltage requirements. For example, the topology 100 may undergo specific adaptation for each customer application.

Figure 2:
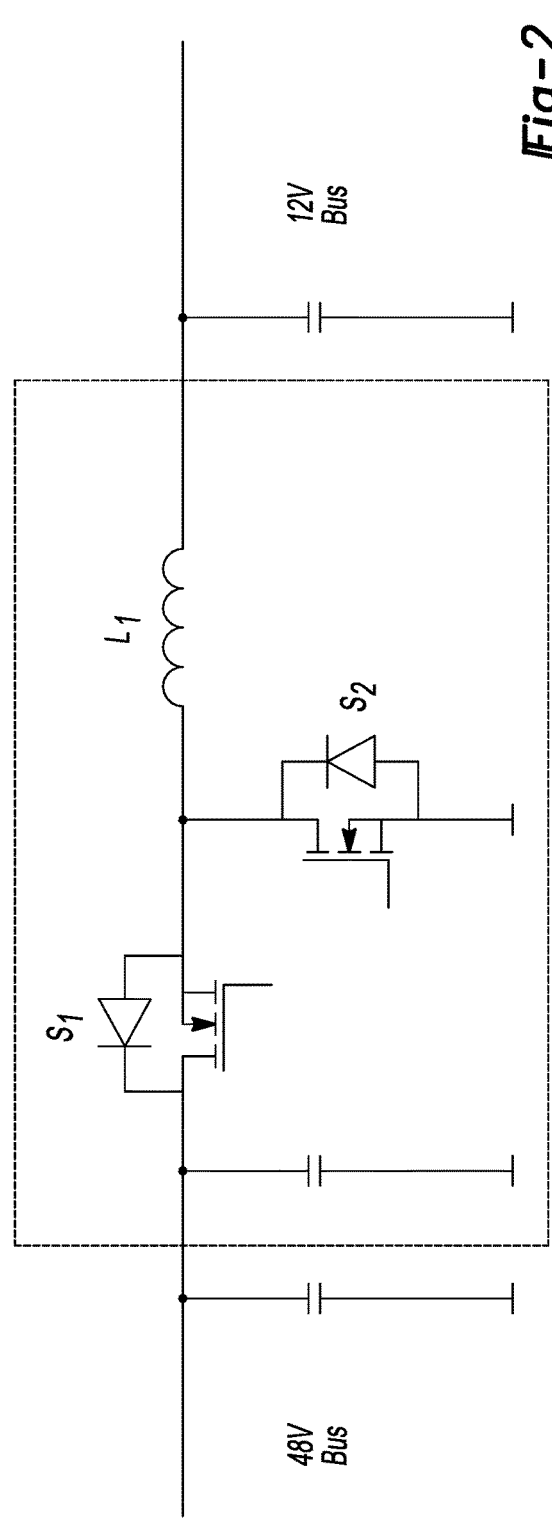
FIG. 2 depicts one example of a synchronous buck-boost DC/DC converter.

FIG. 2 depicts one example of a synchronous buck-boost DC/DC converter 110. The converter 110 may be used for medium voltage (MV)—LV DC/DC converter for 3 kW. Similar to the LLC topology 100, components that form the converter 110 may require new components along with new development to support differing converter voltage requirements. Additionally, the converter 110 may undergo specific adaptation for each customer application.

FIG. 3 depicts one example of a classic LLC DC/DC converter 120. The converter 120 generally includes a first plurality of switches 122a-122d (e.g., metal-oxide-semiconductor field-effect transistor (MOSFET) or other suitable variants thereof) positioned on a HV side 124 of a vehicle 126. The converter 120 may also include a second plurality of switches 130a-130d (e.g., metal-oxide-semiconductor field-effect transistor (MOSFET) or other suitable variants thereof) positioned on a LV side 132 of the vehicle 126. A first inductor 134a, a second inductor 134b and capacitor 136 form a resonant network 132 that is operably coupled to an output of the first plurality of switches 122a-122d. A transformer 140 having a primary side (e.g. primary winding) 142 and a secondary side (e.g., secondary winding) 144 is also shown. The converter 120 is generally configured to convert a HV on the HV side 124 into a LV output. Additionally, the converter 120 may convert a LV on the LV side 132 into a HV output. In this regard, the converter 120 is recognized as a bi-directional converter. In general, the first inductor 134a and the second inductor 134b are coupled in series with one another and are also in parallel with the capacitor 136 and the transformer 140. These components form a primary path for energy flow for the converter 120 and may be bulky and expensive.

FIG. 4 depicts one example of a DC/DC converter 200 (or power conversion device) as a dual active bridge (DAB) topology in accordance with one embodiment. The converter 200 may also be a bi-directional converter and generally includes a single primary winding 142 that is operably coupled with a plurality of secondary windings 244a and 244b. On the LV side 132 (or secondary side 144), the DC/DC converter 200 includes first and second half bridge circuits 220a and 220b. In general, multiple half bridges are provided to increase the current output capabilities of the DC/DC converter 200. The first half bridge circuit 220a includes the secondary winding 244a and a first secondary plurality of switches 250a-250d (e.g., (MOSFETs) or other suitable variants thereof). The second half bridge circuit 220b includes the secondary winding 244b and a second secondary plurality of switches 260a-260d (e.g., (MOSFETs) or other suitable variants thereof). The first plurality of switches 122a-122d on the primary side (or HV side 124) generally forms another bridge.

The first and second half bridge circuits 220a and 200b may be controlled in parallel in the DAB topology. As a result, the activated switches of the first plurality of switches 122a-122d and the second plurality of switches 250a-250d collaborate to define a voltage scenario for inductances of the transformer 140 to linearly increase or decrease the flowing currents accordingly.

That differs, for example, in LLC, where the first bridge provides energy to the LLC system at the primary winding to cause oscillations. Then the transformer of the LLC system transfers the oscillation to the secondary. The secondary bridge converts the energy into DC signals. In one example, with an LLC topology, stages thereof are controlled in series. With the DC/DC converter 200, each stage (e.g., the first half bridge 220a and the second half bridge 220b) is controlled in parallel. In light of this condition, the bridge formed by the switches 122a-122d and the first and second bridge circuits 220a, 220b form a dual active bridge (DAB) topology.

In general, the first half bridge circuit 220a is in parallel with the second half bridge circuit 220b. The first and second half bridge circuits 220a, 220b form a full bridge circuit. Likewise, the secondary windings 244a and 244b are in parallel with one another. The first secondary plurality of switches 250a-250d form an H-bridge structure and the second secondary plurality of switches 260a-260d also form an H-bridge structure. A node 270 is formed on outputs of the first and second half bridge circuits 220a, 220b to provide a current $I_{LV}$. The outputs from the first and second half bridge circuits 220a, 220b at the node 270 are parallel with one another. Additionally, all ground as depicted in the first and second half bridge circuits 220a, 220d are parallel to one another. The DC/DC converter 200 as illustrated may be implemented into a single printed circuit board (PCB). It is recognized that a controller (not shown) may be provided to control the manner in which the first plurality of switches 122a-122d, the first secondary plurality of switches 250a-250d, and the second secondary plurality of switches 260a-260b are activated and deactivated to convert DC energy bi-directionally. As shown, the DC/DC converter 200 does not utilize any bulky inductors which reduces overall cost and provides for the scalability aspect.

Figure 5:
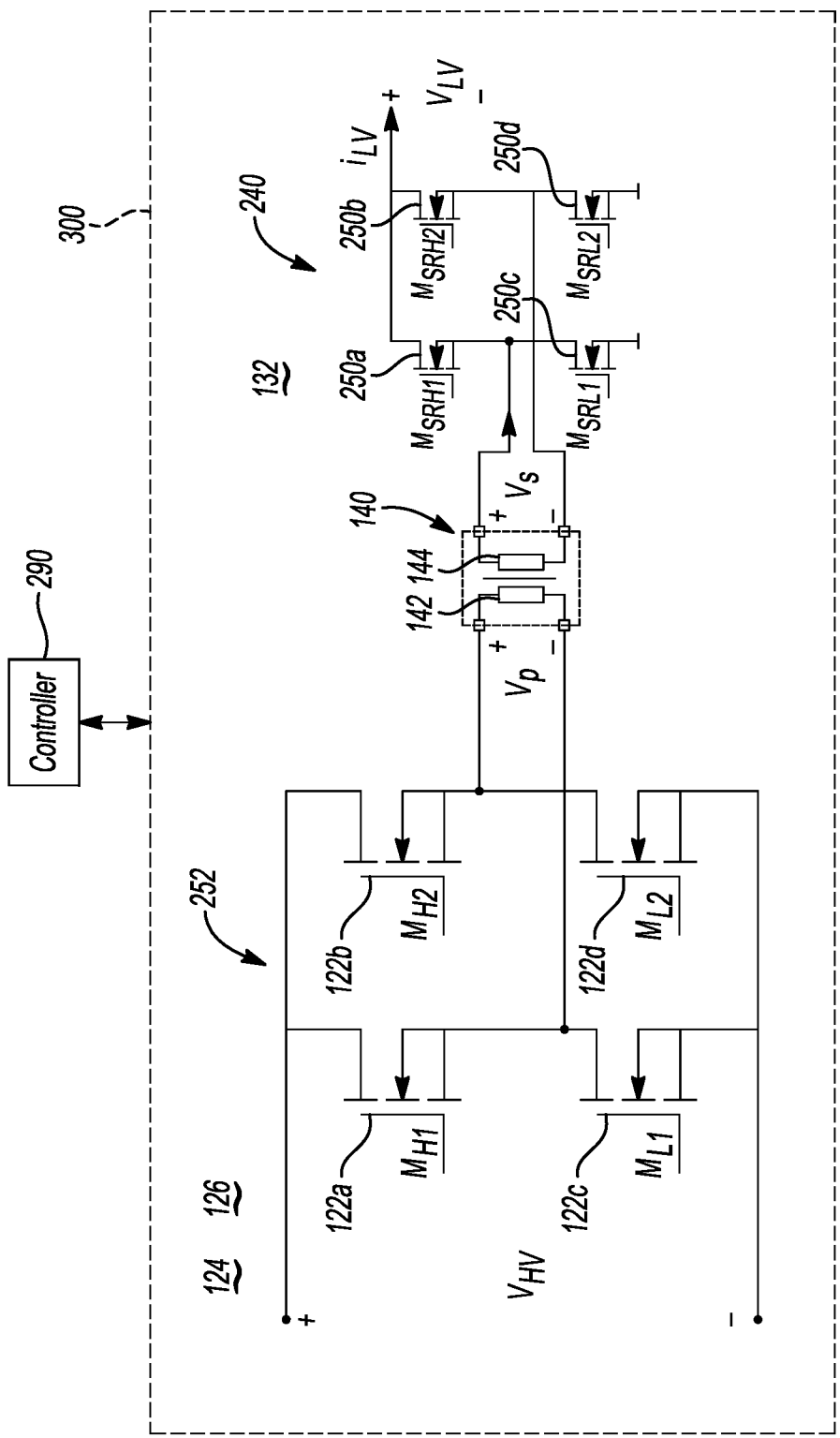
FIG. 5 depicts one example of the DC/DC converter (DAB) with a single primary winding and a single secondary winding in accordance with one embodiment.

FIG. 5 depicts one example of the DC/DC converter 300 in accordance with one embodiment. The DC/DC converter 300 is generally similar to the DC/DC converter 200 of FIG. 4. However, the DC/DC converter 300 provides a single bridge circuit 240 on the secondary side 144 of the LV side 132. The first plurality of switches 122a-122d form another bridge 252. In this case, the DC/DC converter 300 provides a DAB circuit. The DC/DC converter 300 may provide less current on the LV side 132 than that of the DC/DC converter 300. It is recognized that additional half bridge circuits similar to that illustrated in FIG. 4 may be added to increase the current providing capability for the DC/DC converter 300. In reference to the various DAB topologies as set forth herein, the bridge 252 provides rectification (i.e., rectifies alternating current (or oscillating signal) generated in response to the cycling of the first plurality of switches 122a-122d). The bridge 252 provides an input to the transformer 140 and the transformer 140 provides an output to the single bridge circuit 240 to control bi-directional energy conversion and transfer between the DC networks on the HV side 124 and the LV side 132.

When transferring from the HV side 124 to the LV side 132, a high voltage and low current energy may be supplied to the bridge 252 to generate an oscillation, voltage, and current level conversion which is provided as an output of the single bridge circuit 252 as a low voltage and high current energy. Both bridges 249, 252 may take part in stimulating coupled inductances of the transformer 140 to provide the DC/DC conversion. In a similar way, energy may be transferred from the LV side 132 to the HV side 124 (e.g., from the LV network to the HV network). A controller 280 is operably coupled to the first plurality of switches 122a-122d and to the first secondary plurality of switches 250a-250d to selectively switch the same. The controller 280 may employ digital processing of measured voltages and currents at different stages about the DC/DC converter 300. The controller 280 may compare measured currents to target input values and output values as established by real time needs of the system for the vehicle 126. In general, it is the difference between target values and instant measurements that establish the energy transfer flow and direction.

Figure 6:
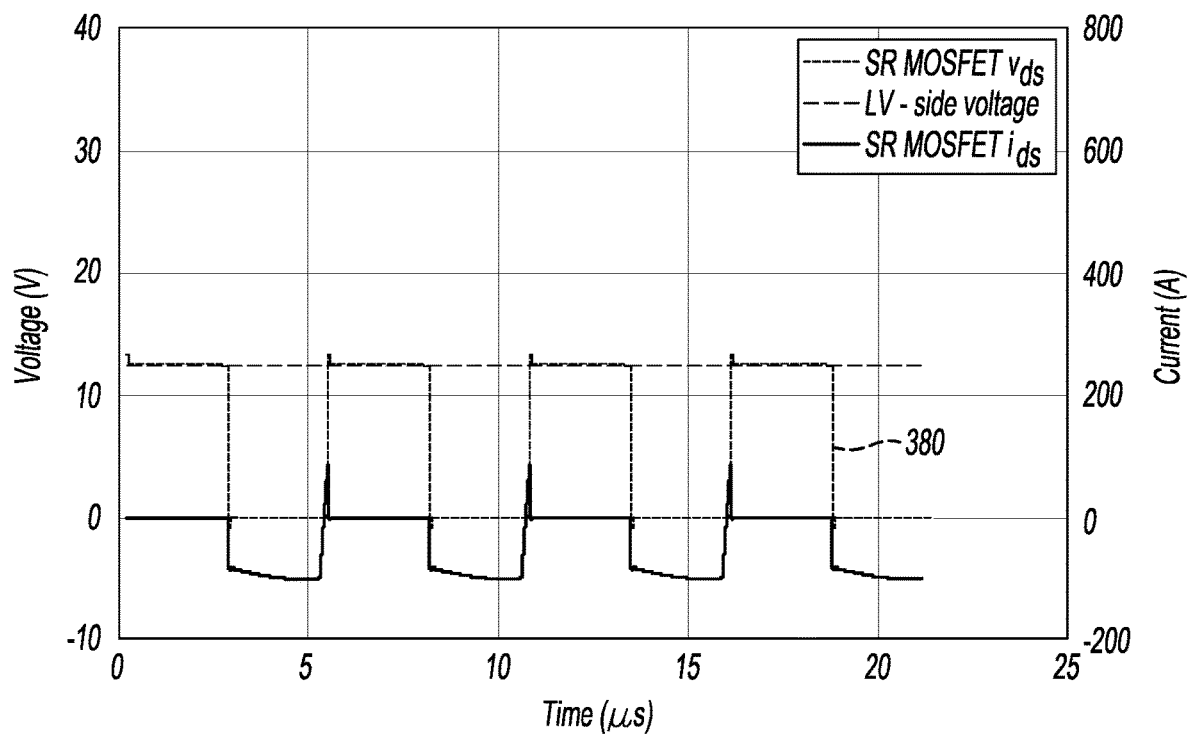
FIG. 6 generally depicts various signals in the DC/DC converter (DAB) configuration as illustrated in FIG. 5.
Figure 7:
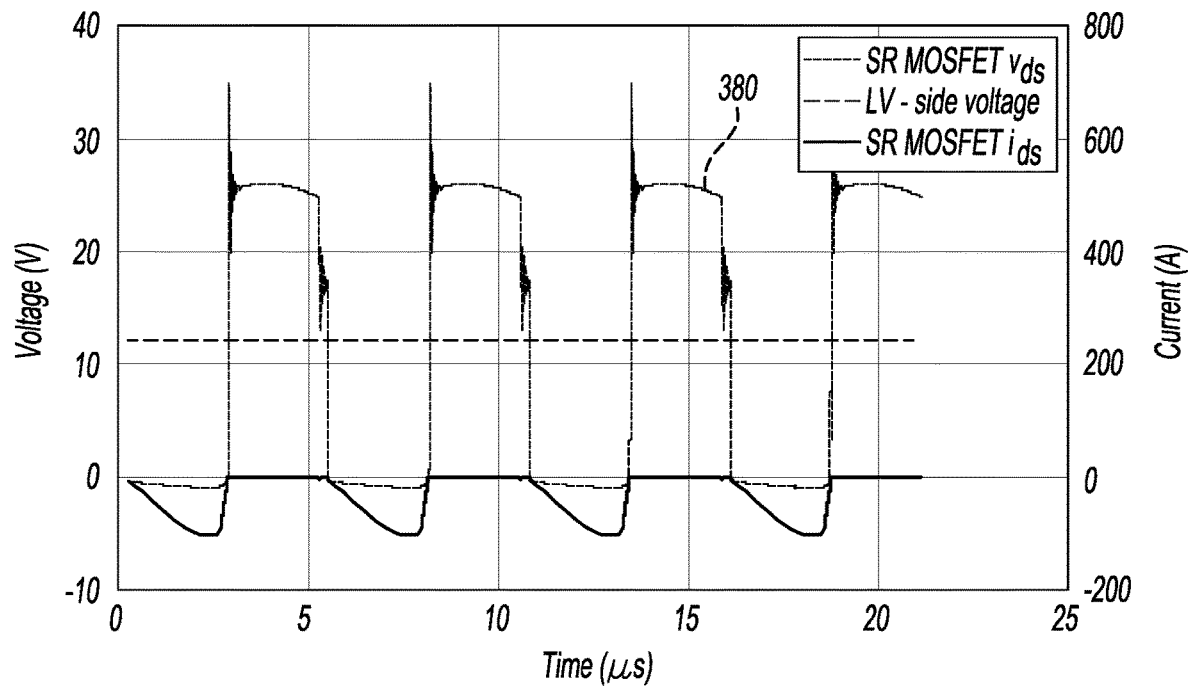
FIG. 7 generally depicts various signals in the classical LLC topology as illustrated in FIG. 3.

A comparison between the DC/DC converter 300 of FIG. 5 and the DC/DC converter 120 of FIG. 3 may be noticed with the plots of FIGS. 6 and 7. FIG. 6 generally depicts various signals associated with the DC/DC converter 300 as illustrated in FIG. 5. FIG. 7 generally depicts various signals in the classical LLC topology as illustrated in DC/DC converter 120 of FIG. 3. As shown in FIG. 6, voltage signal 380 is nearly half of that shown of the voltage signal 380 illustrated in FIG. 7. The voltage signal 380 corresponds to the voltage at the secondary side 144 of the transformer 140. This condition indicates that the DC/DC converter 300 requires lower cost components. For example, the hardware components are less stressed due to the switching waveforms as the switching waveforms are smoother in comparison to that illustrated in FIG. 7. In particular, the voltage signal in FIG. 7 ranges from 0 to approximately 26V (i.e., not counting ringing peaks), while the voltage signal in FIG. 6 ranges from 0 to approximately 12V. This condition may result in less than half of the power being involved. It may also be seen that the switching stability is improved with the DC/DC converter 300 (see FIG. 6) in comparison to the DC/DC converter 120 (see FIG. 7) as FIG. 6 illustrates less spurious ringing with respect to the switches of the DC/DC converter 300. Thus, the DC/DC converter 300 may provide for a stable solution while providing better dynamic response.

The DC/DC converter 300 is generally configured to adapt to different system requirements. In this sense, the same topology of the DC/DC converter 300 may be used for different input and output voltages thereby providing the option of simply selecting components according to the external voltages demands. For example, with a 400V input, the components at the bridge 250 may be selected to withstand 650V, but with an 800V input, these components may move to the 1200V range.

The DC/DC converter 300 may be developed to withstand a limited range of handled powers (e.g., from 500 W to 1 kW) thereby providing a solution in the low range of the automotive needs. Then, if another product is needed with a mild increase of power (e.g., up to 2 kW), the LV side 132 may be required to handle higher current values, may be doubled so that the components at each branch handle half the current and stay at cost-efficient values (e.g., see DC/DC converter 200). Then, the transformer 140 may have as many separate secondary inductances as low-voltage stages. Finally, if the OEM request is for a high power in the market range (e.g., up to 5 kW or even 10 kW), several of the rails may be parallelized sharing a common control system and a common input and output filtering.

Figure 8:
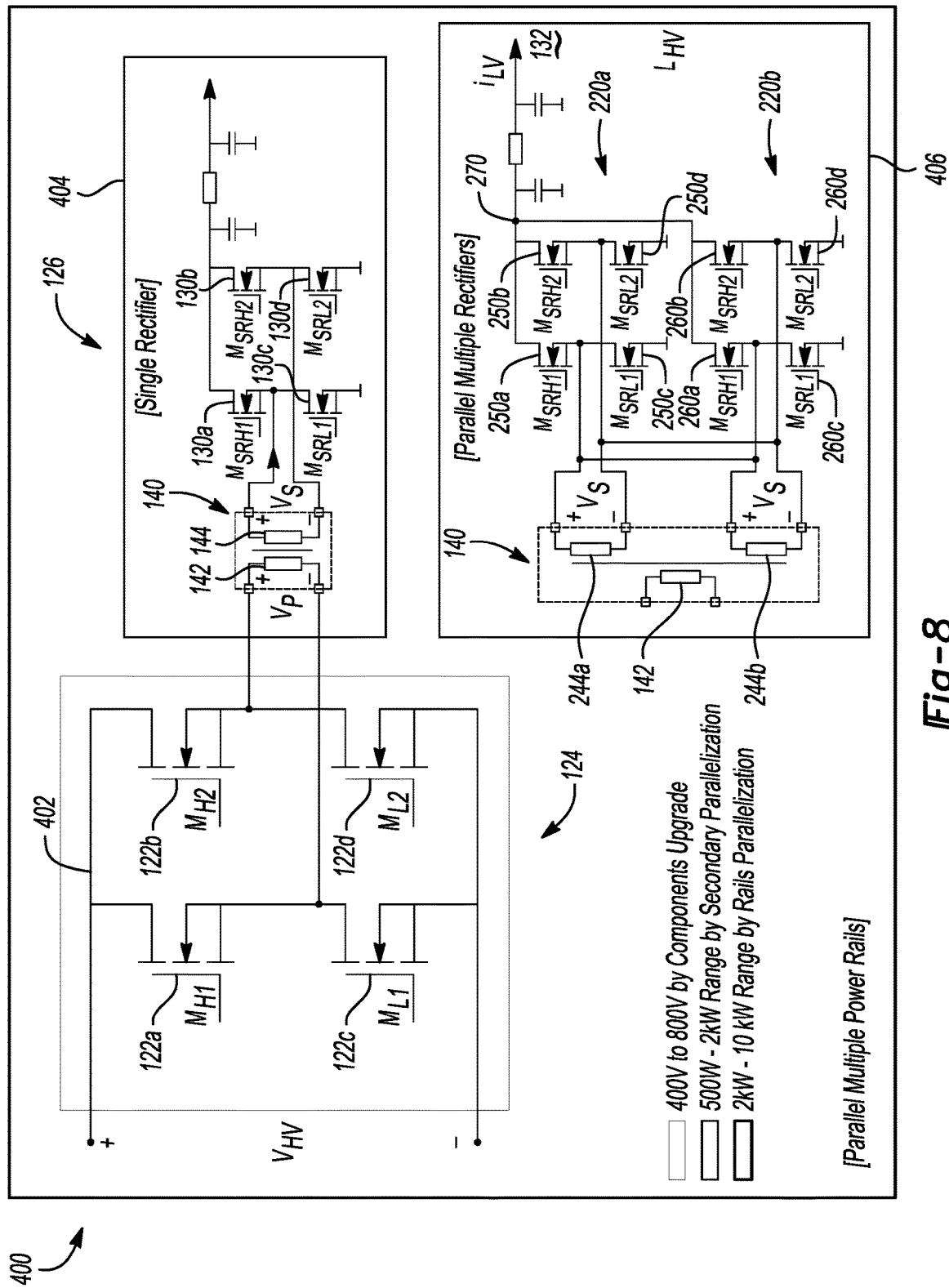
FIG. 8 generally depicts the DC/DC converter (DAB) configuration along with a power rating for portions of the DC/DC converter in accordance to one embodiment.

FIG. 8 generally depicts a DC/DC converter 400 for portions of the DC/DC converter as discussed above in connection with FIGS. 4 and 5 in accordance to one embodiment. Specifically, the DC/DC converter 400 includes a primary portion 402 including the various switches 122a-122d position on the HV side 124 of the converter 400 (i.e., to the left of the transformer 140). The DC/DC converter 400 also includes secondary portions 404 and 406 positioned to the right of the transformer 140 on the LV side of the converter 400. The secondary portion 402 may be defined as a single rectifier since it rectifies the AC output generated by the primary portion 402. In this case, the secondary portion 404 includes the single secondary winding 144 and the single set of switches 130a-130b as set forth with the DC/DC converter 300 in FIG. 5.

The secondary portion 406 includes the plurality of secondary windings 244a, 244b, along with the switches 250a-250d and 260a-260d as set forth with the DC/DC converter 200 in FIG. 4. The secondary portion 406 may for a parallel configuration of multiple rectifiers. Generally, the components illustrated in the primary portion 402 may be rated to a voltage of anywhere between 400 and 800V by component upgrade. The components illustrated in the second portions 404, 406 may be rated to a power of anywhere between 500 W-2 kW. The power rating for the DC/DC converter 400 may be anywhere between 2 kW-10 kW range by utilizing the parallel configuration of multiple rails. A single rectifier may handle a range of 500 W-2 kW when migrating to a parallelized structure of n, half bridge circuits where power may be increased in the range of 2 kW up to 10 kW. In cases of power range of 2 kW up to 10 kW, the H-bridge at the primary side 142 and the transformer 140 may be duplicated. For example, there may be one HV H-bridge, a transformer, and two LV H-bridges in parallel, and this entire circuit (e.g., a rail) may be duplicated in parallel (as two-parallel rails).

Figure 9:
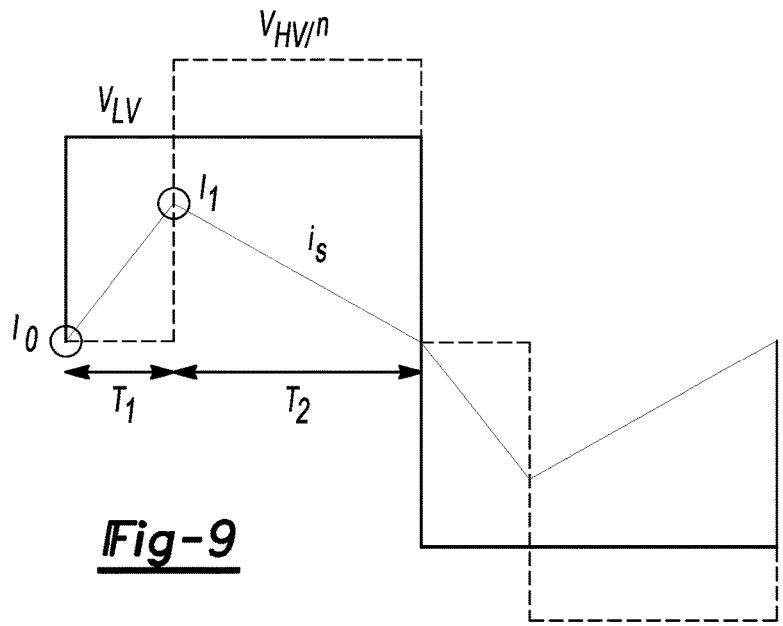
FIG. 9 generally depicts operation signals in the DC/DC converter (DAB) of FIG. 5 in accordance with one embodiment.

FIG. 9 generally depicts resulting signals while controlling one or more of the switches 122a-122d and 250a-250d of the DC/DC converter 300 of FIG. 5 in accordance with one embodiment. In terms of a control strategy for the DC/DC converter 200 and 300 to provide energy transfer, voltages at the input ($V_{HV}$), the output ($V_{LV}$), the transformer primary side ($v_p$) and secondary side ($v_s$) may be measured by voltage sensor(s). Also, current sensors may obtain a measurement of the current at the secondary ($i_s$) (i.e., $i_{meas}$) and the current at the LV side 132 ($I_{LV}$) is needed.

The vehicle system generally provides a target (OBJ) for input and output voltages, as well as output current. As design parameters, the transformer leakage inductance ($L_{LK}$) and the transformer ratio (n) may also be required. To operate the DC/DC converters, the different switches (each of the bridge MOSFETs) 122a-122d, 250a-250d, and/or 260a-260d may be digitally switched to enable a linear current increase or decrease in, for example, four possible phases, or signal period quarters (see T1 and T2 in FIG. 9).

The rate of increase or decrease at each phase (e.g., the current signal slopes) may be dependent of the system parameters and, thus, constant at each signal period.

At the first period quarter of the current ($i_s$) in the secondary side 144 of the transformer 140:

$$i = \frac{V_{LV}}{L_{lk}} \cdot t + I_0$$

And then:

$$I_1 = \frac{V_{LV}}{L_{lk}} \cdot T_1 + I_0$$

At the second period quarter:

$$i = \frac{V_{LV} - V_{HV}/n}{L_{lk}} \cdot t + I_1$$

and then, at the "zero" crossing:

$$I_0 = \frac{V_{LV} - V_{HV}/n}{L_{lk}} \cdot T_2 + I_1$$

Operating these two equations leads to $$T_2 = \frac{V_{LV}}{V_{LV} - V_{HV}/n} \cdot T_1 = \alpha \cdot T_1$$

In this sense, then, to vary the energy transfer by the DC/DC converter 300 (e.g., via the current amplitude), only the duration of the quarters may be adjusted ($T_1$ and $T_2$). Thus, according to the energy transfer needs (the voltage and current targets) $T_1$ and $T_2$ are selected. Then, the controller 280 change the status of the switches 122a-122d and 250a-250d at each period quarter transition point and at the peak or "zero" crossing. Because of system real components, there may be a small deviation of the "zero" value (offset) that is defined while the system is being developed. This is a constant "LOW" value that is used instead of the real zero crossing.

Thus, when the energy flow (the current amplitude) is low, the current signal period (e.g., two times T1 plus T2) is small, but when the energy flow is high, the period may be large. In frequency terms, the signal frequency for controlling the switches 122a-122d and 250a-250d may be high for low current amplitudes and may be low for high current amplitudes.

However, because the component properties (i.e., switch properties) change with frequency, there may be a need to operate in a finite range of frequencies. In this sense, then, a maximum frequency of 100 kHz is considered, and, then, a range from 50 kHz to 100 kHz is considered to provide the power variations for the DC/DC converter 300. As explained, other power ranges may be achieved by scalation.

Figure 10:
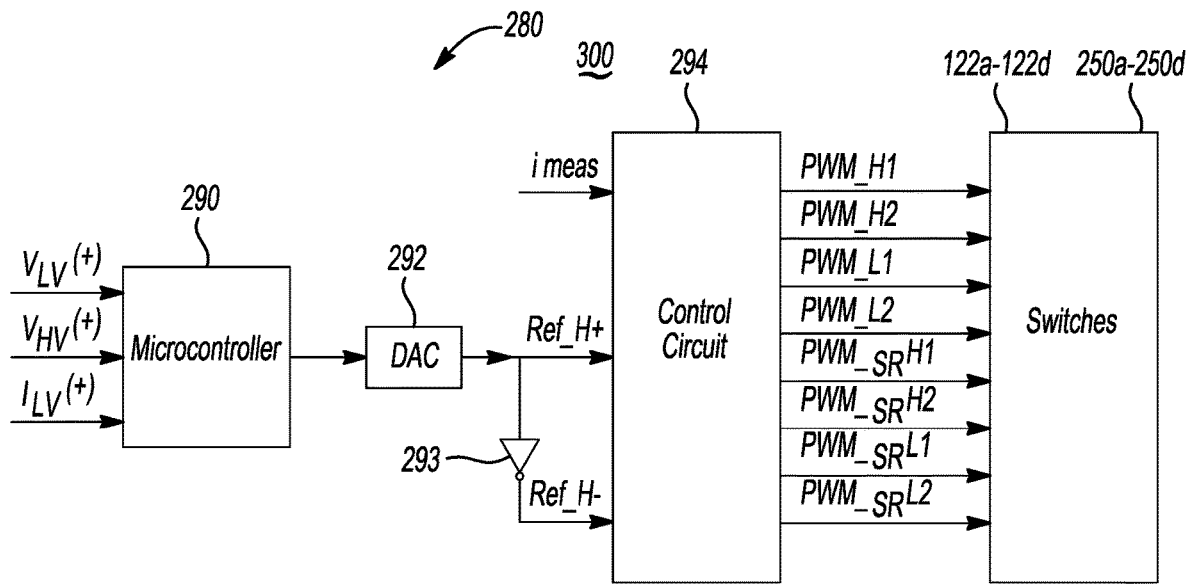
FIG. 10 generally depicts a controller associated with the DC/DC converter in accordance to one embodiment.

FIG. 10 generally depicts aspects related to the controller 280 that are associated with the DC/DC converter 300 in accordance to one embodiment. The controller 280 includes a microcontroller 290 and a control circuit 294. It is recognized that the functions performed by the controller 280, the microcontroller 290 and the control circuit 294 may be distributed on any number of controllers 280. A single controller 280 is illustrated for purposes of description. The DC/DC converter 300 may operate at a frequency of 100 KHz. However, the microcontroller 450 may be arranged to operate a first frequency of, for example, 10 KHz. This aspect may provide for a more cost-efficient implementation. In particular, the microcontroller 290 is generally configured to operate at the first frequency that is less than a second frequency (e.g., 100 KHz) at which the control circuit 294 selectively activates/deactivates the switches 122a-122d and 250a-250d.

The microcontroller 290 receives inputs corresponding to $V_{LV}(t)$ (e.g., measured voltage on the LV network (or LV side 132)) (or low voltage signal), $V_{HV}(t)$ (e.g., measured voltage on the HV network (or HV side 124) (or high voltage signal), and $I_{LV}(t)$ (e.g., measured current across the LV network 132) (or current signal). The signals are received in the time domain where they are converted into the digital domain by the microcontroller 290. The microcontroller 290 may then compare digital versions of $V_{HV}(n)$ (e.g., measured voltage on the HV side 124 (or HV network), and $I_{LV}$ (e.g., measure voltage on LV side 132 (or LV network) to the following digital thresholds $V_{LV,OBJ}(n)$ (or predetermined voltage threshold of the LV side 132 (or LV network)) (corresponds to the desired voltage on the LV network 132)), $V_{HV,OBJ}(n)$ which corresponds to desired voltage on the HV side 124 (or a predetermined voltage on the HV side 124 (or HV network), and $I_{LV,OBJ}(n)$ (or a predetermined current threshold) which corresponds to the desired current on the LV-network 132. The microcontroller 290 generates a first envelope control signal (e.g., Ref_H+). A digital to analog (DAC) converter 292 converts the digital version of the envelope control signal into analog signals to transmission to the control circuit 244. An inverter 293 inverts the first envelope control signal to generate a second envelope control signal (e.g., Ref_H−). In general, the first and second envelop control signals correspond to a translation of maximum current allowed to be transferred by DC/DC converter 300 (e.g., I_LV_OBJ), which is a function of V_LV,OBJ or V_HV_OBJ system current consign. The control circuit 294 receives the first and second envelope control signals along with a measured current signal ($i_{meas}$) to generate various control signals that control the switching operation of the switches 122a-122d and 250a-250d (e.g., signals PWM_H1, PWM_H2, PWM_L1, PWM_L2 for switches 122a-122d, respectively, and signals PWM_srH1, PWM_srH2, PWM_srL1, PWM_srH1 for switches 250a-250d, respectively). It is recognized that $i_{meas}$ may correspond to a high frequency current on the primary side 142 or on the secondary side 144 which may be measured by a shunt or hall sensor. The control circuit 24 generates the signals PWM_H1, PWM_H2, PWM_L1, PWM_L2 and the signals PWM_srH1, PWM_srH2, PWM_srL1, PWM_srH1 somewhere in the range of 100 KH for the various switches 122a-122d and 250a-250d.

Figure 11:
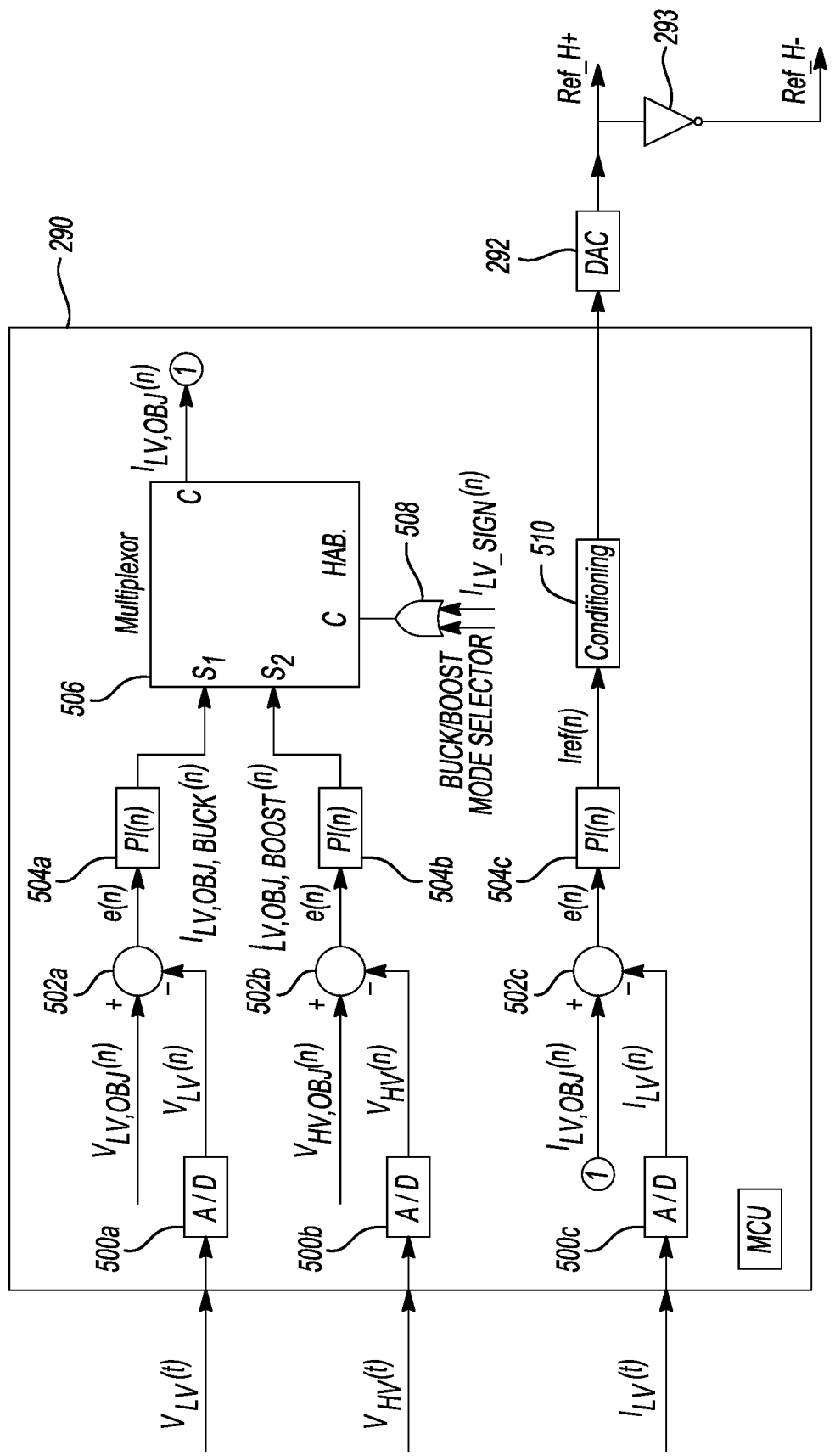
FIG. 11 generally depicts a more detailed implementation of a microcontroller within the controller in accordance to one embodiment.

FIG. 11 generally depicts a more detailed implementation of the microcontroller 290 within the controller 280 in accordance to one embodiment. The microcontroller 290 generally includes a plurality of analog to digital converts ADCs 500a-500c, a plurality of adders 502a-502c, a plurality of proportional integral (PI) controllers 504a-504b, a multiplexer circuit 506, a first gate circuit 508, and a conditioning circuit 510. The ADC 500a receives the low voltage signal ($V_{LV}(n)$) and converts the same into a digital low voltage signal (e.g. $V_{LV}(t)$). The adder 502a takes a difference between the digital low voltage signal and the low voltage threshold signal ($V_{LV,OBJ}(n)$) to generate a first error signal (e.g., $e_1(n)$). The PI controller 504a integrates the first error signal to generate a first desired input current value (e.g., $I_{LV,OBJ\_BUCK}(n)$) which is provided to the multiplexer circuit 506. If the DC/DC converter 300 is in the buck mode, (e.g., decreasing voltage from the HV side 124 (or primary side 142) to the LV side 132 (or secondary side 144)), then the multiplexer 506 transmits the signal $I_{LV,OBJ\_BUCK}(n)$ to the adder 502c which is used as $I_{LV,OBJ}(n)$ (e.g., a predetermined current value for the LV side 132).

Similarly, the ADC 500b receives the high voltage signal ($V_{HV}(t)$) and converts the same into a digital high voltage signal (e.g. $V_{HV}(n)$). The adder 502b takes a difference between the digital high voltage signal and the high voltage threshold signal ($V_{HV,OUT}(n)$) to generate a second error signal (e.g., $e_2(n)$). The PI controller 504b integrates the second error signal to generate a second desired input current value (e.g., $I_{LV,OBJ\_BOOST}(n)$) which is provided to the multiplexer circuit 506. If the DC/DC converter 300 is in the boost mode, (e.g., increasing voltage from the LV side 132 (e.g., secondary side 144) to the HV side 124 (e.g., primary side 142)), then the multiplexer 506 transmits the signal $I_{LV,OBJ\_BOOST}(n)$ to the adder 502c which is used as the $L_{LV,OBJ}(n)$ (e.g., a predetermined current value for the HV side 124).

The first gate circuit 508 monitors whether a signal BUCK/BOOST SELECTOR has been activated or not. In general, the signal BUCK/BOOST SELECTOR may be used as a control signal and generally corresponds to whether the DC/DC converter 300 operates in a buck or boost mode. The first gate circuit 508 also received a signal $I_{LV,SIGN}(n)$. The signal BUCK/BOOST SELECTOR may be a system signal to control the operational mode of the DC/DC converter 300. Additionally, the DC/DC converter 300 may operate in an auto mode. For this case, the signal BUCK/BOOST mode may be determined by the sign or polarity of the current flow (or energy flow) in the DC/DC converter 300 (e.g. current flows from HV side 124 to LV side 132 (e.g., buck mode) or current flows from LV side 132 to HV side 124 (e.g., boost mode)). The signal LV_SIGN may correspond to a signal that is transmitted on a vehicle data communication bus to the microcontroller 290 (e.g., to the controller 280) that is indicative of a command for the DC/DC converter 300 to enter into a buck mode or a boost mode. The signal LV_SIGN may also correspond to a direct measurement of current/voltage that indicates whether the DC/DC converter 300 is in the buck mode or boost mode to provide an automatic transition between such modes. The multiplexer circuit 506 selects either the first desired input current value or the second desired input current value to provide a final desired input current value (e.g., $I_{LV,OBJ}(n)$) based on the type of mode the DC/DC converter 300 is in (e.g., buck or boost mode). The first desired input current value or the second desired input current value may then be transmitted to the adder 502c so that microcontroller 290 may determine the first envelope control signal (e.g., Ref_H+) as described above.

The ADC 500c receives the low current signal ($I_{LV}(t)$) and converts the same into a digital low current signal (e.g. In)). The adder 502c takes a difference between the digital low current signal and the low current threshold signal ($I_{LV,OBJ}(n)$) (e.g., which is based on whether the DC/DC converter 300 is in the buck mode or the boost mode) to generate a third error signal (e.g., $e_2(n)$). The PI controller 504c integrates the third error signal to generate a third desired input current value (e.g., $I_{REF}(n)$) which is provided to the conditioning circuit 510 and subsequently passed to the DAC 292 for digital to analog conversion to produce the first envelope control signal (e.g., Ref_H+). The inverter 293 inverts the first envelope control signal to generate the second envelope control signal (e.g., Ref_H−). The first and second envelope control signals generally corresponds to an overall envelope of the current on the secondary side 144 of the transformer 140. Based on the overall envelope of the current $I_{LV}$ the controller 280 adjusts the manner which the switches 122a-122d, and 250a-250d are controlled to provide the desired current $I_{LV}$. In general, the first and second envelope control signals basically limit an excursion of a triangular current waveform that is at an end amount of power delivered by the DC/DC converter 300. It is recognized that the DC/DC converter 300 may employ the scheme or strategy as noted above for controlling not only the switches 122a-122d and 250a-250d but also the switches 260a-260b (e.g., additional switches that are formed on other half bridge circuits on the secondary side 144).

FIG. 12 depicts a voltage input (e.g., $v_p/n$) at the primary winding 142 of the DC/DC converter 300 in accordance with one embodiment. FIG. 13 depicts a voltage output at the secondary winding 144 of the DC/DC converter 300 in accordance with one embodiment.

FIG. 14 depicts a first portion of the control circuit 294 that controls the switching of the switches 122a-122d on the primary side 142 while the DC/DC converter 300 is in a buck mode (e.g., energy transfer (or conversion) from high voltage to low voltage). The control circuit 294 includes a plurality of flip flops circuits 602a, 602b and a plurality of comparators 604a-604d. The flip flop circuit 602a includes a first output 610a that is operably coupled to the switch 122a and a second output 610b that is operably coupled to the switch 122c. The flip flop circuit 602b includes a first output 610c that is operably coupled to the switch 122b and a second output 610d that is operably coupled to the switch 122d. Each of the flip flop circuits 602a, 602b may be implemented as, for example, a Set-Reset (SR) flip flop circuit.

The comparator 604a compares $i_{meas}$ (the measured current on the secondary side 132) to the first envelope control signal (e.g., Ref_H+). For example, if the measured current is greater than the first envelope control signal, then the comparator 604a outputs "1" which is transmitted to the set input of the flip flop circuit 602a. The flip flop circuit 602a sets the output 610a to activate the switch 122a in response to the set input being activated. Otherwise, there is no change.

The comparator 604b compares $i_{meas}$ (the measured current) to a third envelope control signal (e.g., Ref_L+) which is generally set to zero. For example, if the third envelope control signal is greater than the measured current, then the comparator 604a outputs "1" which is transmitted to a reset input of the flip flop circuit 602a. The flip flop circuit 602a sets the output 610b to activate the switch 122c and clears the output 610a to deactivate the switch 122a in response to the reset input being activated. Otherwise, there is no change.

The comparator 604c compares $i_{meas}$ (the measured current) to the second envelope control signal (e.g., Ref_H−). For example, if the second envelope control signal is greater than the measured current, then the comparator 604c outputs "1" which is transmitted to the set input of the flip flop circuit 602b. The flip flop circuit 602b sets the output 610c to activate the switch 122b in response to the set input being activated. Otherwise, there is no change.

The comparator 604d compares $i_{meas}$ (the measured current) to the third envelope control signal which is generally set to zero. For example, if the measured current is greater than the third envelope control signal, then the comparator 604a outputs "1" which is transmitted to a reset input of the flip flop circuit 602b. The flip flop circuit 602b sets the output 610d to activate the switch 122d and clears the output 610c to deactivate the switch 122b in response to the reset input being activated. Otherwise, there is no change.

Figure 15:
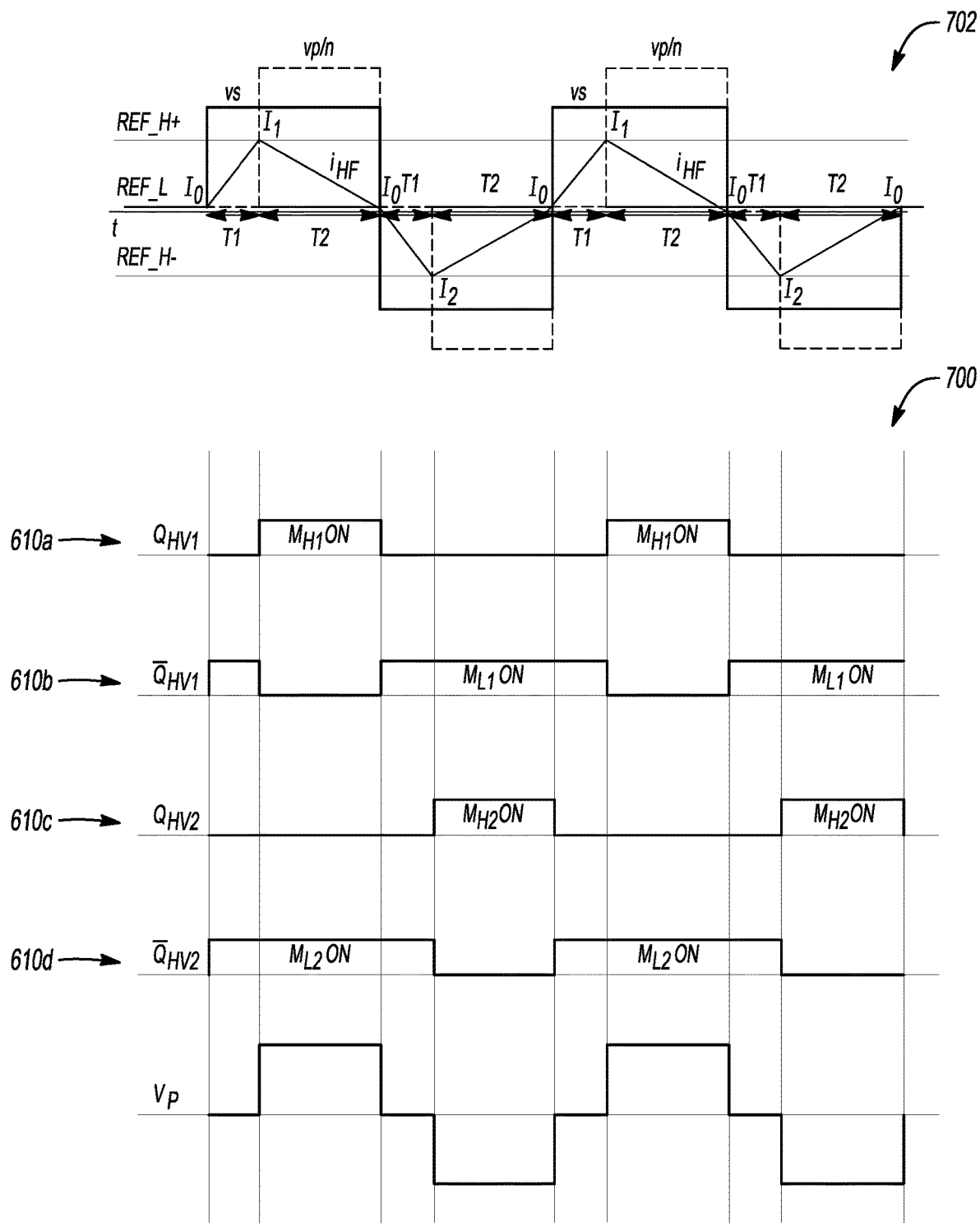
FIG. 15 depicts corresponding first and second envelope control signals received by the first portion of the control circuit and corresponding flip flop outputs for selectively controlling the one or more switches based at least on the first and second envelope control signals in accordance with one embodiment.

FIG. 15 generally illustrates the states of the outputs 610a-610d based on the first envelope control signal (e.g., Ref_H+), the second envelope control signals (e.g., Ref_H−), the third envelope control signal (e.g., Ref_L), and the measured current . . . , (the measured current) while the DC/DC converter 300 is in the buck mode (e.g., energy transfer (or conversion) from high voltage to low voltage). The states of the outputs 610a-610d are generally shown at 700. The states of the outputs 610a-610d are generally shown in reference to voltage at the primary winding 142 ($v_{pn}$) and the voltage at the secondary winding 144 ($v_s$) over time (this is generally shown at 702). In general, the flip flop circuit 602a is set at $I_1$ and reset at each $I_0$ (decreasing) while the flip flop circuit 602b is set at $I_2$ and reset at each $I_0$ (increasing). Thus, when the switches 122a and 122d are activated or ON, the primary winding 142 receives a high voltage and when the switches 122b and 122c are ON, the primary winding 142 receives the high voltage at an inverted state.

Figure 16:
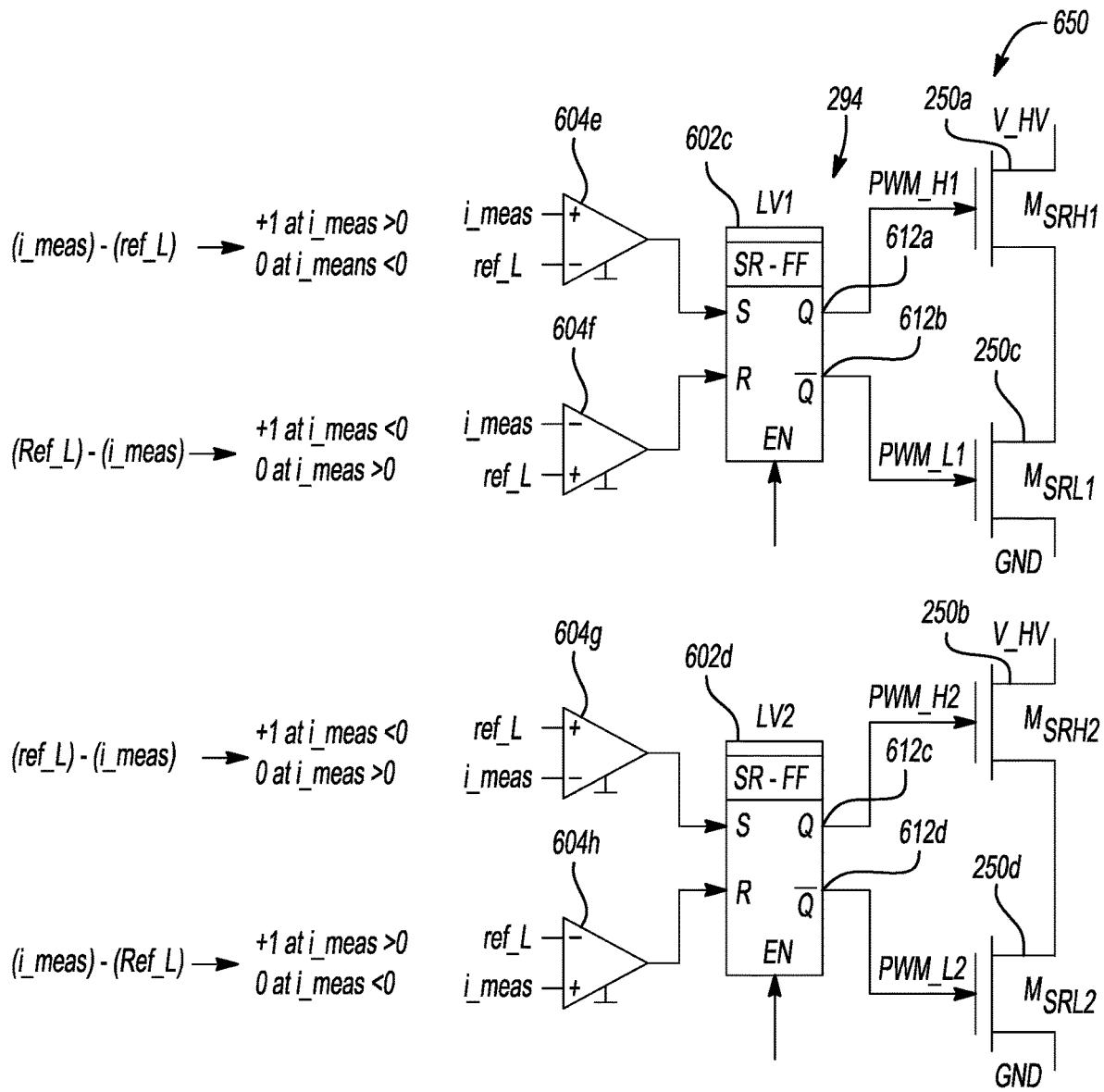
FIG. 16 depicts a second portion of the control circuit for selectively controlling one or more switches in accordance with one embodiment.

FIG. 16 depicts a second portion of the control circuit 294 that control the switching of the switches 250a-250d on the secondary side 144 while the DC/DC converter 300 is in the buck mode (e.g., energy transfer (or conversion) from high voltage to low voltage). The control circuit 294 includes a plurality of flip flops circuits 602c, 602d and a plurality of comparators 604e-604h. The flip flop circuit 602c includes a first output 612a that is operably coupled to the switch 250a and a second output 612b that is operably coupled to the switch 250c. The flip flop circuit 602d includes a first output 612c that is operably coupled to the switch 250b and a second output 612d that is operably coupled to the switch 250d. Each of the flip flop circuits 602c, 602d may be implemented as, for example, a Set-Reset (SR) flip flop circuit.

The comparator 604e compares $i_{meas}$ (the measured current on the secondary side 144 of the transformer 140) to the third envelope control signal (e.g., Ref_L+) which is close to zero. For example, if the measured current is greater than the third envelope control signal, then the comparator 604e outputs "1" which is transmitted to the set input of the flip flop circuit 602c. The flip flop circuit 602c sets the output 612a to activate the switch 250a in response to the set input being activated. Otherwise, there is no change.

The comparator 604f compares the third envelope control signal to $i_{meas}$ (the measured current on the secondary side of the transformer 140) to the third envelope control signal (e.g., Ref_L) which is generally close to zero. For example, if the third envelope control signal is greater than the measured current, then the comparator 604f outputs "1" which is transmitted to a reset input of the flip flop circuit 602c. The flip flop circuit 602a sets the output 612b to activate the switch 250c and clears the output 612b to deactivate the switch 250a in response to the reset input being activated. Otherwise, there is no change.

The comparator 604g compares the third envelope control signal (e.g., Ref_L) which is set to zero to $i_{meas}$ (the measured current on the secondary side 144 of the transformer 140) to the third envelope control signal (e.g., Ref_L). For example, if the third envelope control signal is greater than the measured current, then the comparator 604g outputs "1" which is transmitted to the set input of the flip flop circuit 602d. The flip flop circuit 602d sets the output 612c to activate the switch 250b in response to the set input being activated. Otherwise, there is no change.

The comparator 604h compares $i_{meas}$ (the measured current on the secondary side of the transformer 140) to the third envelope control signal (e.g., Ref_L+) which is generally close to zero. For example, if the measured current is greater than the third envelope control signal, then the comparator 604h outputs "1" which is transmitted to a reset input of the flip flop circuit 602d. The flip flop circuit 602d sets the output 612d to activate the switch 250d and clears the output 612c to deactivate the switch 250b in response to the reset input being activated.

Figure 17:
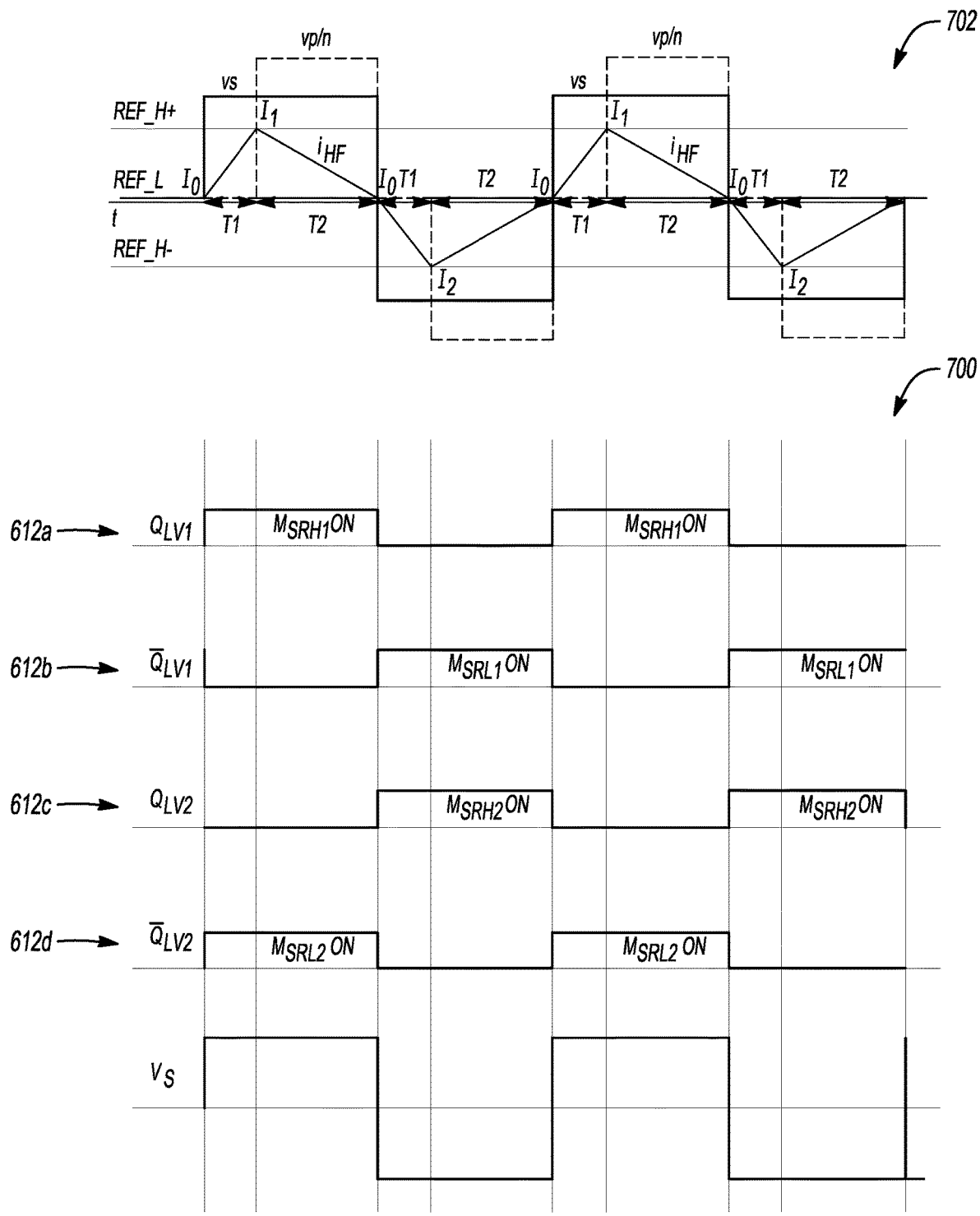
FIG. 17 depicts corresponding first and second envelope control signals received by the second portion of the control circuit and corresponding flip flop outputs for selectively controlling the one or more switches based at least on the first and second envelope control signals in accordance with one embodiment.

FIG. 17 generally illustrates the states of the outputs 612a-612d based on the first envelope control signal (e.g., Ref_H+), the second envelope control signals (e.g., Ref_H-), the third envelope control signal (e.g., Ref_L), and the measured current ($i_{meas}$ (the measured current) while the DC/DC converter 300 is in the buck mode (e.g., energy transfer (or conversion) from high voltage to low voltage). The states of the outputs 612a-612d are generally shown at 700. The states of the outputs 610a-610d are generally shown in reference to voltage at the primary winding 142 ($v_p/n$) and the voltage at the secondary winding 144 ($v_s$) over time (this is generally shown at 702). In general, at the secondary side 144 of the transformer 140, sign changes of the measured current $i_{meas}$, or $I_0$ points, generates sets and resets to flip-flops 602c and 602d. In this case, when the switches 250a and 250d are activated or ON, the secondary side 144 of the transformer 140 (e.g., $v_s$) sees the low voltage of the LV side 132. Also, when the switches 250b and 250c are activated or ON, the secondary side 144 of the transformer 140 ($v_s$) sees the low voltage of the LV side 132 inverted. Thus, when the switches 250a and 252a are activated or ON, the secondary side 144 of the transformer 140 sees the low voltage in an inverted state.

Figure 18:
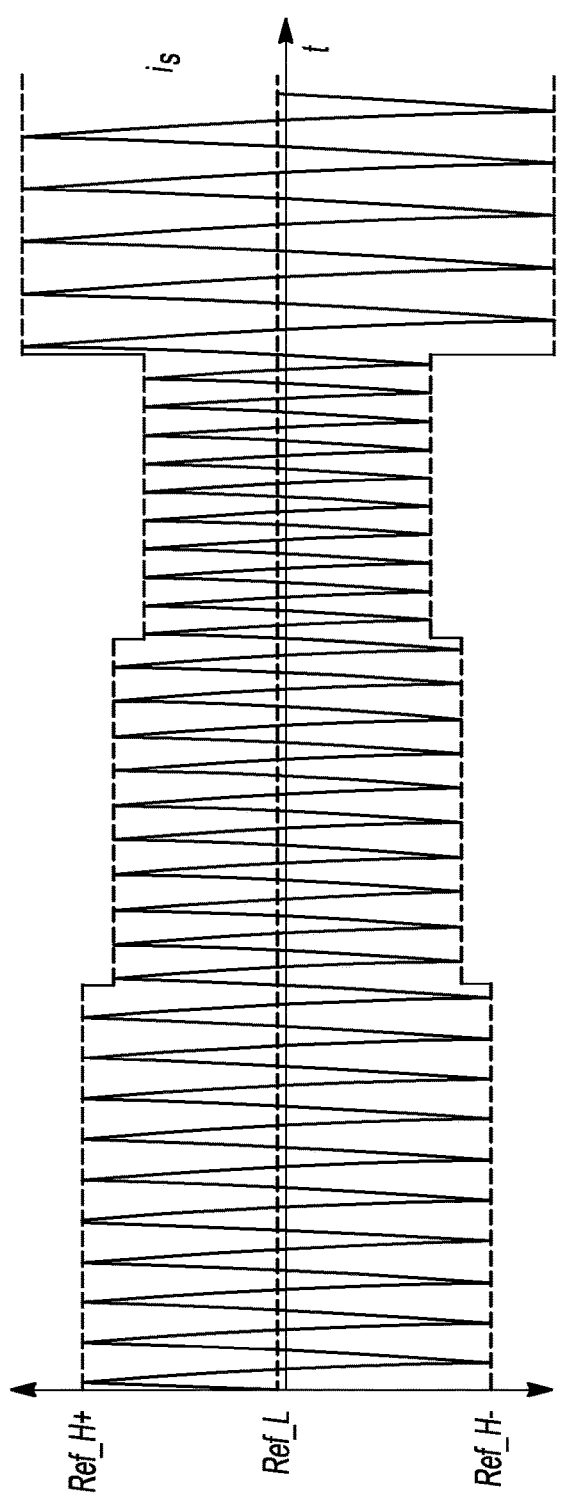
FIG. 18 generally depicts changes that occur to the first and second envelope control signals in accordance to one embodiment.

FIG. 18 generally depicts changes that occur to the first and second envelope control signals in accordance to one embodiment. For example, it may be seen that being that the current-signal slopes are constant, changes in the first and second envelope control signals (e.g., energy transfers) translate direction into frequency changes (or period changes). Additionally, it can be seen that three is a desirable reaction (or dynamic response) to large changes in the current demand for the DC/DC converter 300 (e.g., the large abrupt steps in Ref_H+ and Ref_H-).

Figure 19:
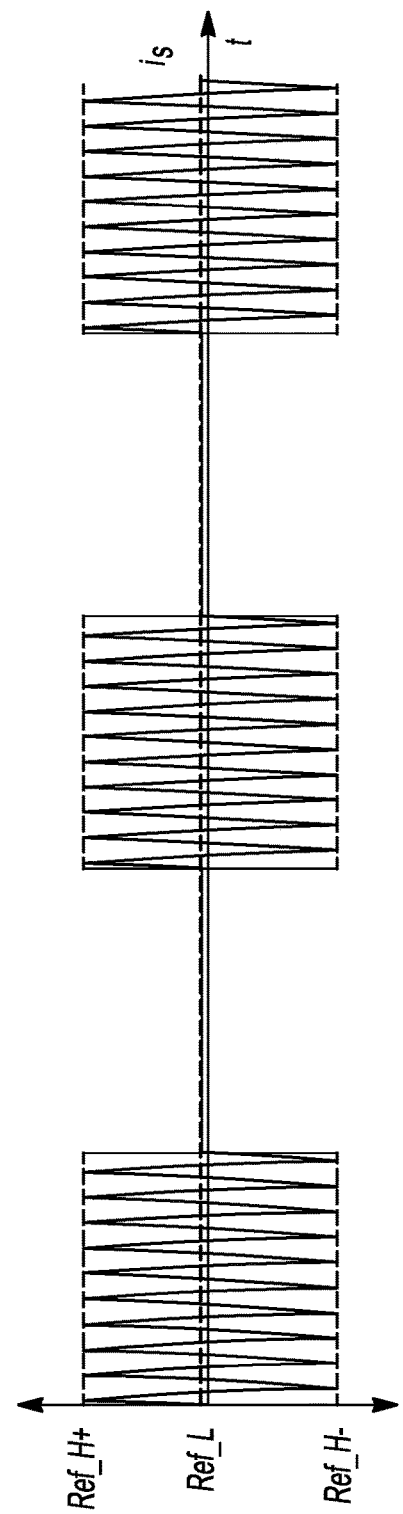
FIG. 19 generally depicts the first and second envelope control signals including blanking times in accordance to one embodiment.

FIG. 19 generally depicts the first and second envelope control signals including blanking times in accordance to one embodiment. It has been noted that the control circuit 294 may operation, for example, to a maximum frequency of 100 kHz. This directly translates to values of T1 and T2 and, thus, to the minimum energy that may be transferred with the implementation noted herein. However, at system start-up, and at given working periods, it may be expected that the DC/DC converter is required to provide lower energy transfer values.

To cope with such lower energy transfer values, the controller 280 may employ a different strategy such as, for example, the control envelope signals including blanking periods, whereby the first envelope control signal (e.g. Ref_H+) and the second envelope control signal (Ref_H-) may be set to the Ref_L value (or close to zero). In this case, switching of the switches 122a-122d and 250a-250d may not be performed at these blanking periods (e.g., all switches are open) and the current signal may be zero. Adjusting the blanking times with the minimum current (e.g., at 100 hHz) times, lower output current values may be generated. However, one drawback of this discontinuous control mode (e.g., blanking mode) is the increase of ripple at the output signal, due to the blanking times. But, as the energy flow is so low, the ripple although relatively high, may be small and still fall within system requirements. Blanking may be generated either with Ref_H+ and Ref_H- values, or disabling the operation of the flip-flop circuits 602a-602d (e.g., EN input).

Figure 20:
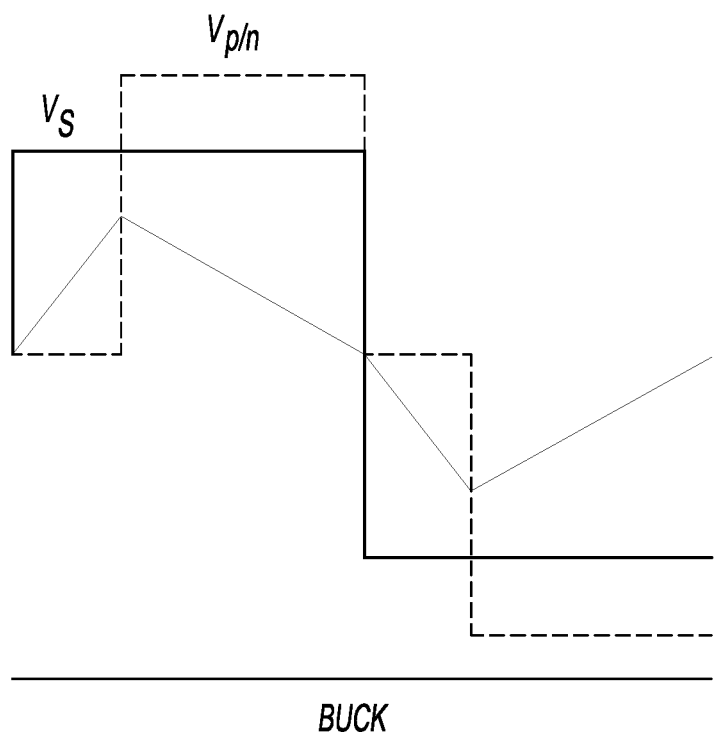
FIG. 20 depicts one example of a primary voltage signal, a secondary voltage signal, and a secondary current signal while the DC/DC converter in a buck mode in accordance with one embodiment.
Figure 21:
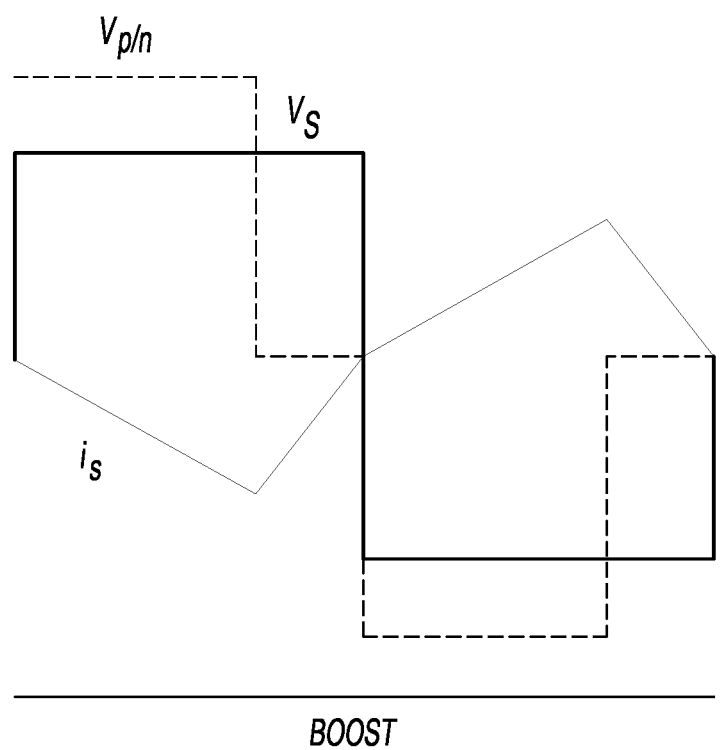
FIG. 21 depicts one example of a primary voltage signal, a secondary voltage signal, and a secondary current signal while the DC/DC converter in in a boost mode in accordance with one embodiment.

FIG. 20 depicts one example of the voltage at the primary winding 142 ($v_p/n$) and the voltage at the secondary winding 144 ($v_s$), and current on the secondary side of the transformer 140 ($i_s$) while the DC/DC converter 300 is in a buck mode in accordance with one embodiment. FIG. 21 depicts one example of a of the voltage at the primary winding 142 ($v_p/n$) and the voltage at the secondary winding 144 ($v_s$), and current on the secondary side of the transformer 140 ($i_s$)

while the DC/DC converter 300 is in a boost mode in accordance with one embodiment.

To this point in the disclosure, the examples as set forth describe the transfer of energy from the HV side 124 to the LV side 132 (e.g., the DC/DC converter 300 is in a buck mode in this state). This may generally be the case for voltage conversions ranging from 400V to 12V, 800V to 12V, 400V to 48V, 800V to 48V or even 48V to 12V. However, in the vehicle 126, there may be moments in which a reverse energy transfer may be needed or requested (i.e., the DC/DC converter 300 operates in a boost mode).

Figure 26:
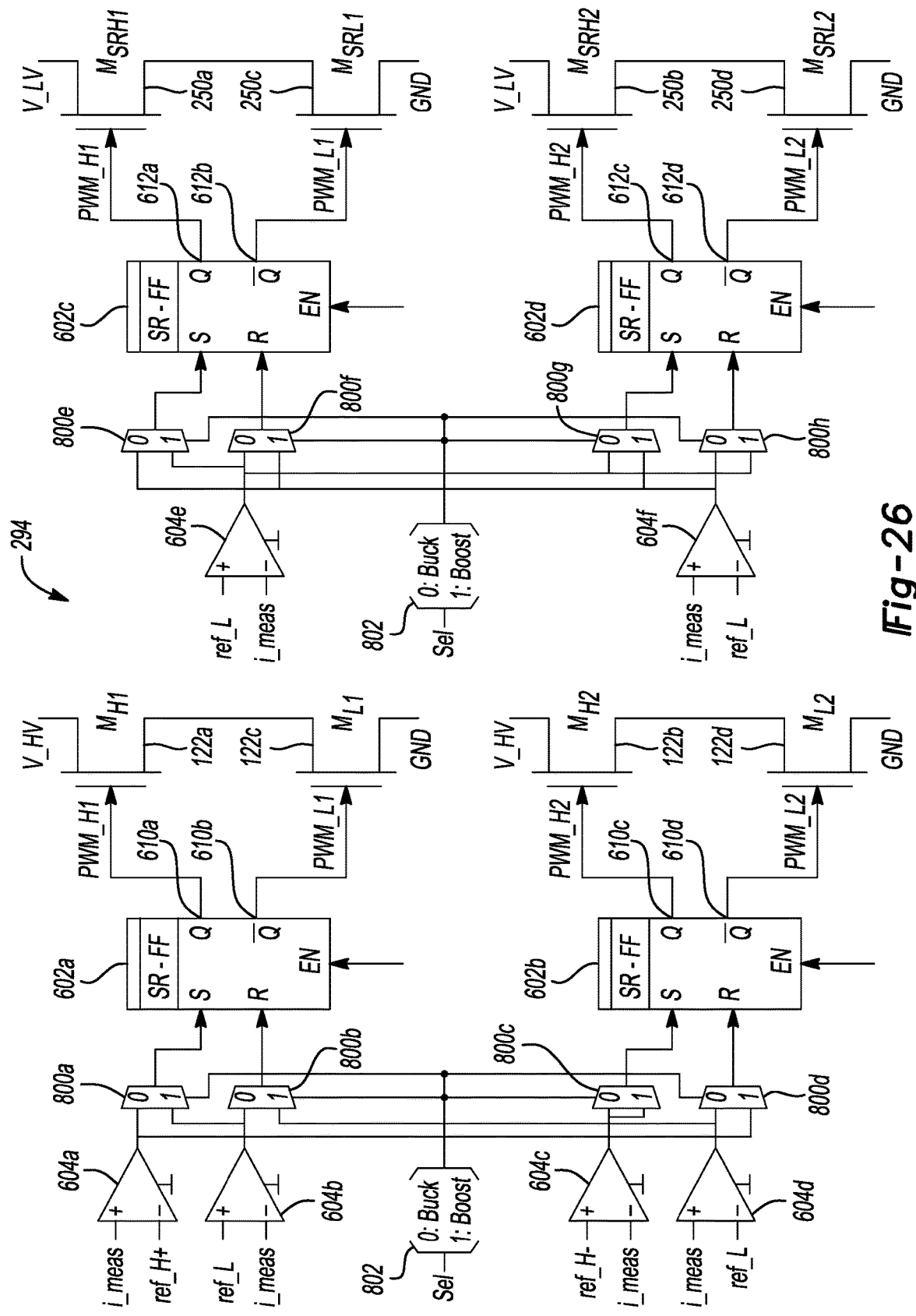
FIG. 26 depicts one example of multiplexing for performing buck or boost selection in relation to the control circuit in accordance to one embodiment.

In general, the transition from the buck to boost mode may be decided based on system requirements. In the boost mode, the multiplexer 506 as set forth in FIG. 11 may be switched to the boost mode to select the voltage processing of the HV side 124 to generate the target current $I_{LV\_OBJ}(n)$. Alternatively, the selection between boost or buck may be performed in the control circuit 294. This may be further illustrated in connection with FIG. 26. For example, multiplexers 800a-800g having an input pair may be positioned between the comparators 604a-604f as illustrated in FIG. 26. A selector switch 802 may be coupled to the multiplexers 800a-800g to select between the buck or the boost mode. This option may be preferable when separate hardware integrated circuits are used. Alternatively, a separate set of hardware devices may be multiplexed at the triggering of the switches 122a-122d and 250a-250d. This option may be preferable when the hardware is part of a field programmable gate array (FPGA).

Figure 22:
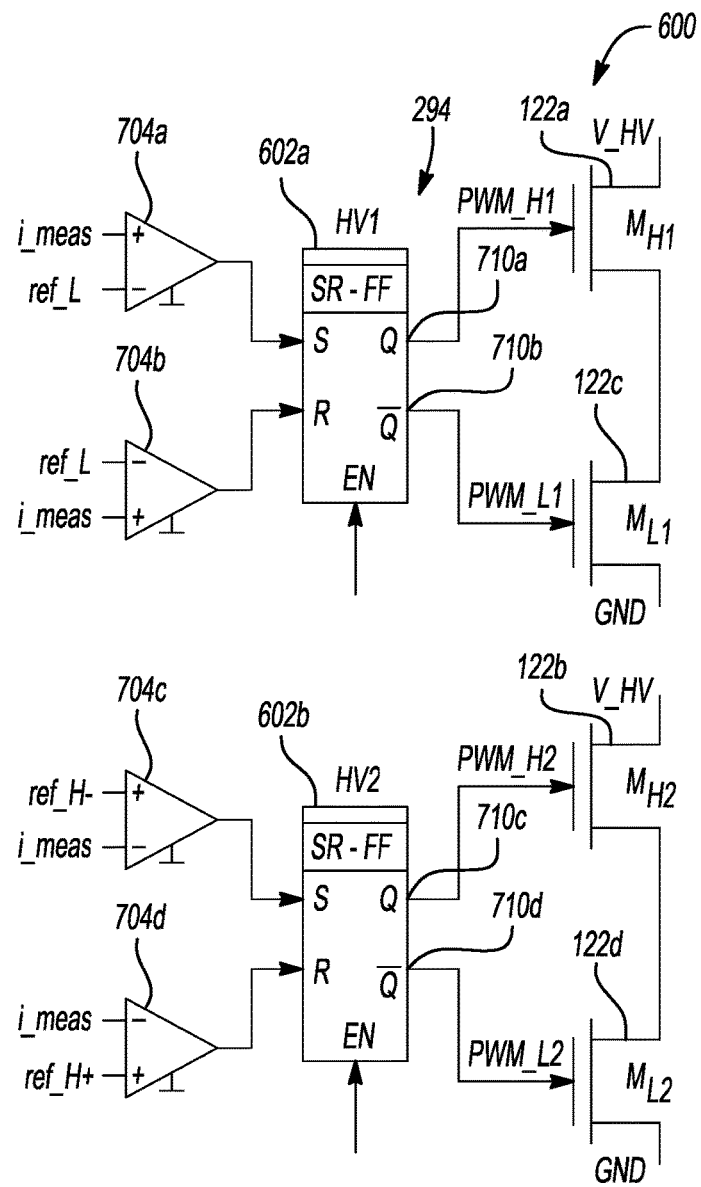
FIG. 22 depicts the first portion of the control circuit for selectively controlling one or more switches in accordance with one another embodiment.

FIG. 22 depicts the first portion of the control circuit 294 for selectively controlling one or more switches 122a-122d on the HV side 124 (or at the primary stage of the transformer 140) while the DC/DC converter 300 is in a boost mode (e.g., energy transfer (or conversion) from low voltage to high voltage). The control circuit 294 includes the plurality of flip flop circuits 602a, 602b and a plurality of comparators 704a-704d. The flip flop circuit 602a includes a first output 710a that is operably coupled to the switch 122a and a second output 710b that is operably coupled to the switch 122c. The flip flop circuit 702b includes a first output 710c that is operably coupled to the switch 122b and a second output 712d that is operably coupled to the switch 122d. Each of the flip flop circuits 602a, 602b may be implemented as, for example, a Set-Reset (SR) flip flop circuit.

The comparator 704a compares $i_{meas}$ (the measured current on the secondary side 132) to the third envelope control signal (e.g., Ref_L which is generally close to zero). For example, if the third envelope control signal is greater than the measured current, then the comparator 704a outputs "1" which is transmitted to the set input of the flip flop circuit 602a. The flip flop circuit 602a sets the output 710a to activate the switch 122a in response to the set input being activated. Otherwise, there is no change.

The comparator 704b compares $i_{meas}$ (the measured current) to a third envelope control signal (e.g., Ref_L) which is generally close to zero. For example, if measured current is greater than the third envelope control signal, then the comparator 704b outputs "1" which is transmitted to the reset input of the flip flop circuit 602a. The flip flop circuit 602a sets the output 710b to activate the switch 122c and clears the output 710a to deactivate the switch 122a in response to the reset input being activated. Otherwise, there is no change.

The comparator 704c compares the second envelope control signal (e.g., Ref_H−) to $i_{meas}$ (the measured current). For example, if the second envelope control signal is greater than the measured current, then the comparator 704c outputs "1" which is transmitted to the set input of the flip flop circuit 602b. The flip flop circuit 602b sets the output 710c to activate the switch 122b in response to the set input being activated. Otherwise, there is no change.

The comparator 704d compares the $i_{meas}$ (the measured current) to the first envelope control signal (e.g., Ref_H−). For example, if the measured current is greater than the first envelope control signal, then the comparator 604d outputs "1" which is transmitted to a reset input of the flip flop circuit 602b. The flip flop circuit 602b sets the output 710d to activate the switch 122d and clears the output 710c to deactivate the switch 122b in response to the reset input being activated. Otherwise, there is no change.

Figure 23:
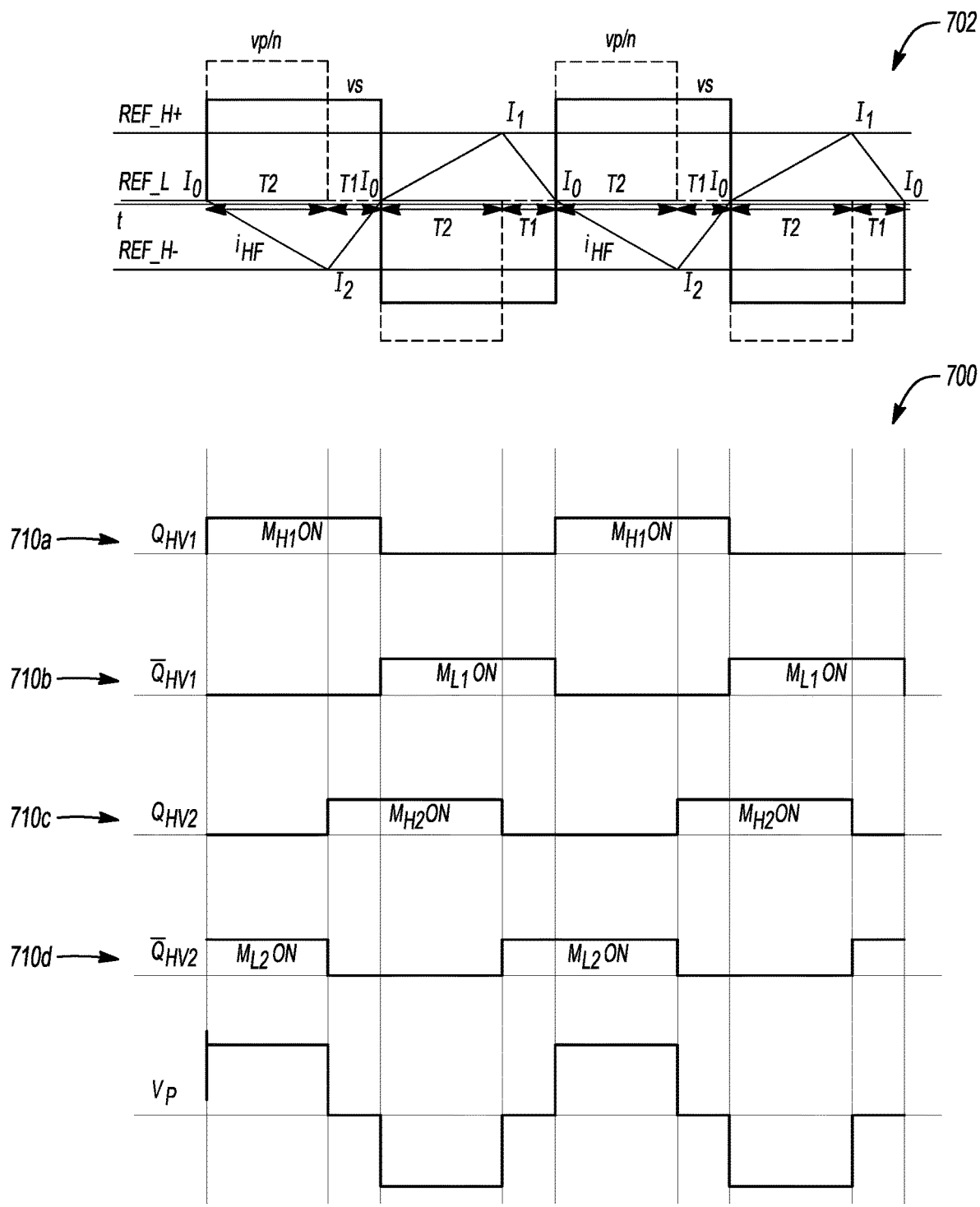
FIG. 23 depicts corresponding first and second envelope control signals received by the first portion of the control circuit and corresponding flip flop outputs for selectively controlling the one or more switches based at least on the first and second envelope control signals of FIG. 22 in accordance with one embodiment.

FIG. 23 generally illustrates the states of the outputs 710a-710d based on the first envelope control signal (e.g., Ref_H+), the second envelope control signals (e.g., Ref_H−), the third envelope control signal (e.g., Ref_L), and the measured current ($i_{meas}$ (the measured current) while the DC/DC converter 300 is in the boost mode (e.g., energy transfer (or conversion) from low voltage side 132 to the high voltage side 124). The states of the outputs 710a-710d are generally shown at 700. The states of the outputs 710a-710d are generally shown in reference to voltage at the primary winding 142 ($v_{pn}$) and the voltage at the secondary winding 144 ($v_s$) over time (this is generally shown at 702). In general, the flip flop circuit 602a is set at $I_0$ (decreasing) and reset at each $I_2$ (decreasing) while the flip flop circuit 602b is set at $I_0$ (increasing) and reset at each $I_1$. Thus, when the switches 122a and 122d are activated or ON, the primary side of the transformer 140 receives a high voltage and when the switches 122b and 122c are ON, the primary side receives the high voltage at an inverted state.

Figure 24:
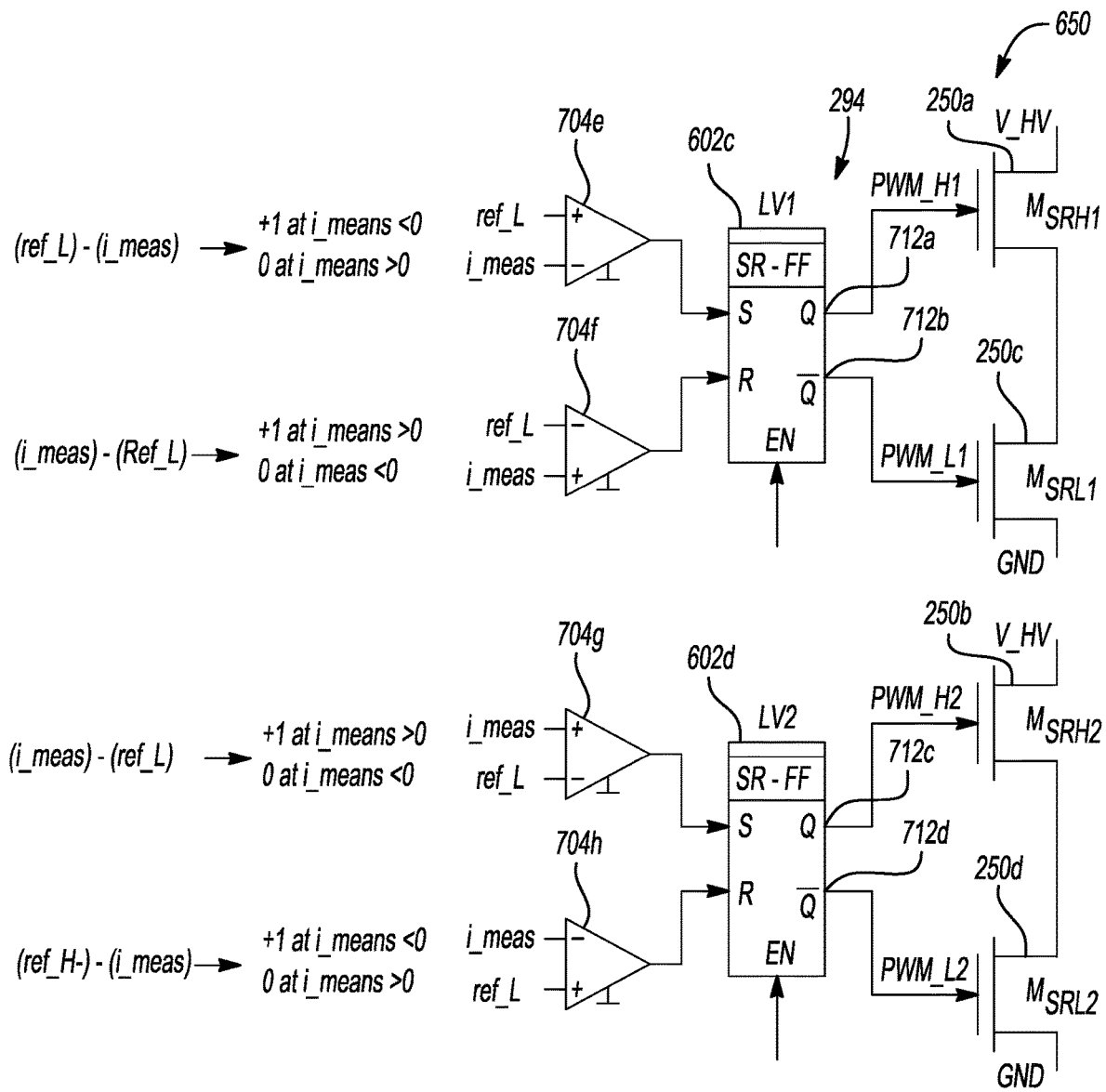
FIG. 24 depicts the second portion of the control circuit for selectively controlling one or more switches in accordance with one another embodiment.

FIG. 24 depicts the second portion of the control circuit 294 for selectively controlling one or more switches 250a-250d on the secondary side 144 of the transformer 140 while the DC/DC converter 300 is in a boost mode (e.g., energy transfer (or conversion) from low voltage to high voltage). The control circuit 294 includes the plurality of flip flop circuits 602c, 602d and a plurality of comparators 704e-704h. The flip flop circuit 602c includes a first output 712a that is operably coupled to the switch 250a and a second output 712b that is operably coupled to the switch 250c. The flip flop circuit 602d includes a first output 712c that is operably coupled to the switch 250b and a second output 712d that is operably coupled to the switch 250d. Each of the flip flop circuits 602a, 602b may be implemented as, for example, a Set-Reset (SR) flip flop circuit.

The comparator 704e compares the third envelope control signal (e.g., Ref_L) which is close to zero to $i_{meas}$ (the measured current on the secondary side 144 of the transformer 140). For example, if the third envelope control signal is greater than the measured current, then the comparator 704e outputs "1" which is transmitted to the set input of the flip flop circuit 602c. The flip flop circuit 602c sets the output 712a to activate the switch 250a in response to the set input being activated. Otherwise, there is no change.

The comparator 704f compares $i_{meas}$ (the measured current) to the third envelope control signal which is generally close to zero. For example, if the measured current is greater than the third envelope control signal, then the comparator 704f outputs "1" which is transmitted to a reset input of the flip flop circuit 602c. The flip flop circuit 602c sets the output 712b to activate the switch 250c and clears the output 712a to deactivate the switch 250a in response to the reset input being activated. Otherwise, there is no change.

The comparator 704g compares $i_{meas}$ (the measured current on the secondary side of the transformer 140) to the third envelope control signal (e.g., Ref_L+) which is close to zero. For example, if the measured current is greater than third envelope control signal, then the comparator 704g outputs "1" which is transmitted to the set input of the flip flop circuit 602d. The flip flop circuit 602d sets the output 712c to activate the switch 250b in response to the set input being activated. Otherwise, there is no change.

The comparator 704h compares the third envelope control signal which is generally set to zero to $i_{meas}$ (the measured current). For example, if the third envelope control signal is greater than the measured current, then the comparator 704h outputs "1" which is transmitted to a reset input of the flip flop circuit 602d. The flip flop circuit 602d sets the output 712d to activate the switch 250b and clears the output 712c to deactivate the switch 250b in response to the reset input being activated. Otherwise, there is no change.

Figure 25:
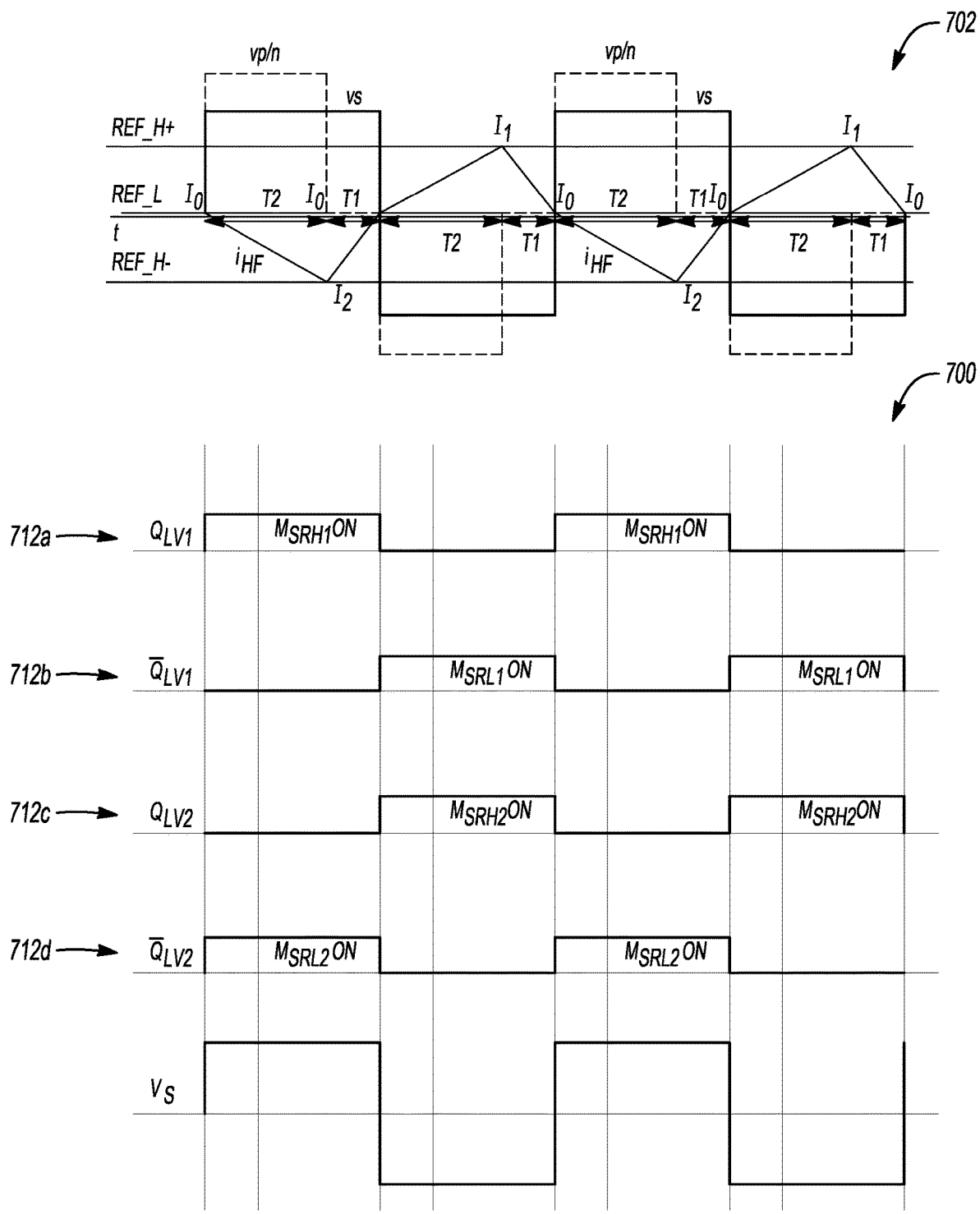
FIG. 25 depicts corresponding first and second envelope control signals received by the second portion of the control circuit and corresponding flip flop outputs for selectively controlling the one or more switches based at least on the first and second envelope control signals of FIG. 24 in accordance with one embodiment.

FIG. 25 generally illustrates the states of the outputs 712a-712d based on the first envelope control signal (e.g., Ref_H+), the second envelope control signals (e.g., Ref_H−), the third envelope control signal (e.g., Ref_L), and the measured current ($i_{meas}$ (the measured current)) while the DC/DC converter 300 is in the boost mode (e.g., energy transfer (or conversion) from low voltage side 132 to the HV side 124). The states of the outputs 710a-710d are generally shown at 700. The states of the outputs 712a-712d are generally shown in reference to the voltage at the primary winding 142 ($v_{pn}$) and the voltage at the secondary winding 144 ($v_s$) over time (this is generally shown at 702). In general, when the switches 250a and 250d are ON, the secondary side of the transformer 140 sees a low voltage and when the switches 250b and 250c are ON, the secondary side of the transformer see the low voltage inverted.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A power conversion device for a vehicle, the power conversion device comprising:
   a transformer including a primary side and a secondary side;
   a microcontroller configured to operate at a first frequency to receive a first current signal indicative of a current of a first voltage network and to generate a first envelope control signal in response to the first current signal; and
   a controller configured to selectively switch a first plurality of switches on the primary side and a second plurality of switches on the secondary side to convert a first input signal into a first output signal in response to at least the first envelope control signal, wherein the controller is configured to selectively switch the first plurality of switches and the second plurality of switches at a second frequency that is greater than the first frequency.

2. The power conversion device of claim 1, wherein the microcontroller includes a first adder circuit configured to receive a first predetermined current threshold indicative of a desired current across the first voltage network and the first current signal to generate a first error signal.

3. The power conversion device of claim 2, wherein the microcontroller includes a first controller configured to integrate the first error signal to generate the first envelope control signal.

4. The power conversion device of claim 2, wherein the microcontroller is further configured to receive a first voltage signal indicative of a voltage on the first voltage network and to receive a second voltage signal indicative of a voltage on a second voltage network, and wherein the first voltage network is different than the second voltage network.

5. The power conversion device of claim 4, wherein the microcontroller includes a second adder circuit configured to receive the first voltage signal and a first predetermined voltage threshold indicative of a desired voltage of the first voltage network to generate a second error signal.

6. The power conversion device of claim 5, wherein the microcontroller includes a first controller configured to integrate the second error signal to generate the first predetermined current threshold when the power conversion device is in a buck mode.

7. The power conversion device of claim 4, wherein the microcontroller includes a second adder circuit configured to receive the second voltage signal and a first predetermined voltage threshold indicative of a desired voltage of the second voltage network to generate a second error signal.

8. The power conversion device of claim 7, wherein the microcontroller includes a first controller configured to integrate the second error signal to generate the first predetermined current threshold when the power conversion device is in a boost mode.

9. The power conversion device of claim 1 further comprising an inverter circuit configured to invert the first envelope control signal to generate a second envelope control signal.

10. The power conversion device of claim 9, wherein the controller is further configured to selectively switch the first plurality of switches on the primary side and the second plurality of switches on the secondary side of the transformer to convert the first input signal into the first output signal based on at least one of the first envelope control signal, the second envelope control signal, and a measured current value across one of the primary side of the transformer and the secondary side of the transformer.

11. A power conversion device for a vehicle, the power conversion device comprising:
    a microcontroller configured to operate at a first frequency to receive a first current signal indicative of a current of a first voltage network and to generate a first envelope control signal in response to the first current signal; and
    a controller configured to selectively switch a first plurality of switches on a first side of a transformer and a second plurality of switches on a second side of the transformer to convert a first input signal into a first output signal in response to at least the first envelope control signal, wherein the controller is configured to selectively switch the first plurality of switches and the second plurality of switches at a second frequency that is greater than the first frequency.

12. The power conversion device of claim 11, wherein the microcontroller includes a first adder circuit configured to receive a first predetermined current threshold indicative of a desired current across the first voltage network and the first current signal to generate a first error signal.

13. The power conversion device of claim 12, wherein the microcontroller includes a first controller configured to integrate the first error signal to generate the first envelope control signal.

14. The power conversion device of claim 12, wherein the microcontroller is further configured to receive a first voltage signal indicative of a voltage on the first voltage network and to receive a second voltage signal indicative of a voltage on a second voltage network, and wherein the first voltage network is different than the second voltage network.

15. The power conversion device of claim 14, wherein the microcontroller includes a second adder circuit configured to receive the first voltage signal and a first predetermined voltage threshold indicative of a desired voltage of the first voltage network to generate a second error signal.

16. The power conversion device of claim 15, wherein the microcontroller includes a first controller configured to integrate the second error signal to generate the first predetermined current threshold when the power conversion device is in a buck mode.

17. The power conversion device of claim 14, wherein the microcontroller includes a second adder circuit configured to receive the second voltage signal and a first predetermined voltage threshold indicative of a desired voltage of the second voltage network to generate a second error signal.

18. The power conversion device of claim 17, wherein the microcontroller includes a first controller configured to integrate the second error signal to generate the first predetermined current threshold when the power conversion device is in a boost mode.

19. A computer-program product embodied in a non-transitory computer readable medium that is programmed to convert a first input signal into a first output signal in a vehicle, the computer-program product comprising instructions to:
   operate at a first frequency to receive a first current signal indicative of a current of a first voltage network and to generate a first envelope control signal in response to the first current signal; and
   selectively switch a first plurality of switches on a first side of a transformer and a second plurality of switches on a second side of the transformer to convert the first input signal into the first output signal in response to at least the first envelope control signal, wherein the second frequency is greater than the first frequency.

20. The computer-program product of claim 19 further comprising instructions to:
   invert the first envelope control signal to generate a second envelope control signal, and;
   selectively switch the first plurality of switches and the second plurality of switches to convert the first input signal into first output signal based on at least one of the first envelope control signal, the second envelope control signal, and a measured current value across one of the first side of the transformer and the second side of the transformer.

* * * * *